US008621512B2

(12) United States Patent
Ellis et al.

(10) Patent No.: US 8,621,512 B2
(45) Date of Patent: Dec. 31, 2013

(54) INTERACTIVE TELEVISION PROGRAM GUIDE WITH SIMULTANEOUS WATCH AND RECORD CAPABILITIES

(75) Inventors: Michael D. Ellis, Boulder, CO (US); Thomas R. Lemmons, Sand Springs, OK (US); Connie T. Marshall, Muskogee, OK (US); Donald W. Allison, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/280,215

(22) Filed: Oct. 24, 2011

(65) Prior Publication Data

US 2012/0151526 A1 Jun. 14, 2012

Related U.S. Application Data

(63) Continuation of application No. 11/894,622, filed on Aug. 20, 2007, which is a continuation of application No. 11/154,065, filed on Jun. 15, 2005, now abandoned, which is a continuation of application No. 10/723,586, filed on Nov. 24, 2003, now abandoned, which is a continuation of application No. 09/329,850, filed on Jun. 11, 1999, now abandoned.

(60) Provisional application No. 60/089,487, filed on Jun. 16, 1998.

(51) Int. Cl.
*G06F 3/00* (2006.01)

(52) U.S. Cl.
USPC .......................................................... 725/39

(58) Field of Classification Search
USPC .......................................................... 725/39
See application file for complete search history.

(56) References Cited

U.S. PATENT DOCUMENTS 4,907,079 A 3/1990 Turner et al.
5,047,867 A 9/1991 Strubbe et al.
(Continued)

FOREIGN PATENT DOCUMENTS

EP 0682452 A2 11/1995
EP 0 762756 6/2002
(Continued)

OTHER PUBLICATIONS

User's Guide RCA Color TV with TV Plus + Guide, 1997.
(Continued)

*Primary Examiner* — Bian Pendleton
*Assistant Examiner* — Olugbenga Idowu
(74) *Attorney, Agent, or Firm* — Ropes & Gray LLP

(57) ABSTRACT

An interactive television program guide system is provided in which a user may use the program guide to watch one program while simultaneously recording another program without interrupting the recording or viewing process. This interactive television program guide system also allows a user the to utilize all or some of the program guide features while in the watch and record mode depending on the embodiment that is being implemented. Further, this watch and record system may be implemented using a multiple tuner set-top box or a single tuner set-top box with a RF bypass or digital switch. In addition to a set-top box, the system may be implemented using a satellite receiver, an advanced television with a processor and memory, or a computer. The various implementations provide a very versatile watch and record environment for the user.

24 Claims, 18 Drawing Sheets

(56) References Cited

U.S. PATENT DOCUMENTS

| | | |
|---|---|---|
| 5,187,589 A | 2/1993 | Kono et al. |
| 5,223,924 A | 6/1993 | Strubbe |
| 5,285,284 A | 2/1994 | Takashima et al. |
| 5,296,931 A | 3/1994 | Na |
| 5,353,121 A | 10/1994 | Young et al. |
| 5,469,206 A | 11/1995 | Strubbe et al. |
| 5,479,302 A | 12/1995 | Haines |
| 5,483,277 A | 1/1996 | Granger |
| 5,483,278 A | 1/1996 | Strubbe et al. |
| 5,485,221 A | 1/1996 | Banker et al. |
| 5,532,754 A | 7/1996 | Young et al. |
| 5,583,560 A | 12/1996 | Florin et al. |
| 5,592,551 A | 1/1997 | Lett et al. |
| 5,629,733 A | 5/1997 | Youman et al. |
| 5,650,827 A | 7/1997 | Tsumori et al. |
| 5,727,060 A | 3/1998 | Young |
| 5,754,730 A | 5/1998 | Windrem et al. |
| 5,757,441 A * | 5/1998 | Lee et al. ............. 348/731 |
| 5,774,859 A | 6/1998 | Houser et al. |
| 5,805,763 A | 9/1998 | Lawler et al. |
| 5,809,204 A | 9/1998 | Young et al. |
| 5,812,937 A | 9/1998 | Takahisa et al. |
| 5,850,218 A * | 12/1998 | LaJoie et al. ............. 725/45 |
| 5,880,768 A | 3/1999 | Lemmons et al. |
| 5,929,944 A | 7/1999 | Seo |
| 5,977,964 A | 11/1999 | Williams et al. |
| 5,986,650 A | 11/1999 | Ellis et al. |
| 5,990,927 A | 11/1999 | Hendricks et al. |
| 6,014,184 A | 1/2000 | Knee et al. |
| 6,058,242 A | 5/2000 | Kim |
| 6,091,883 A | 7/2000 | Artigalas et al. |
| 6,097,383 A | 8/2000 | Gaughan et al. |
| 6,115,079 A | 9/2000 | McRae |
| 6,125,230 A | 9/2000 | Yaginuma |
| 6,141,488 A | 10/2000 | Knudson et al. |
| 6,177,931 B1 | 1/2001 | Alexander et al. |
| 6,240,555 B1 | 5/2001 | Shoff et al. |
| 6,251,017 B1 | 6/2001 | Leason et al. |
| 6,334,022 B1 | 12/2001 | Ohba et al. |
| 6,334,217 B1 * | 12/2001 | Kim ............. 725/38 |
| 6,388,714 B1 | 5/2002 | Schein et al. |
| RE37,881 E | 10/2002 | Haines |
| 6,515,680 B1 | 2/2003 | Hendricks et al. |
| 6,668,278 B1 | 12/2003 | Yen et al. |
| 2001/0024564 A1 | 9/2001 | Young et al. |
| 2003/0117445 A1 | 6/2003 | Hendricks et al. |
| 2003/0159147 A1 | 8/2003 | Young et al. |
| 2005/0251828 A1 | 11/2005 | Young et al. |
| 2010/0118187 A1 | 5/2010 | Macrae et al. |

FOREIGN PATENT DOCUMENTS

| | | |
|---|---|---|
| JP | 05-083688 | 4/1993 |
| JP | 06-111413 | 4/1994 |
| JP | 06-303541 | 10/1994 |
| JP | 07-098970 | 4/1995 |
| WO | WO 96-31980 | 10/1996 |
| WO | WO 96-41478 | 12/1996 |
| WO | WO 00-59214 | 10/2000 |

OTHER PUBLICATIONS

"Advanced Analog Systems—Addressable Terminals" General Instrument Corp. of Horsham, Pennsylvania (URL:http/www.gi.com/BUSAREA/ANALOG/TERMINAL/WATCH/ watch.html) Printed from the Internet on Mar. 4, 1999.

* cited by examiner

INTERACTIVE TELEVISION PROGRAM GUIDE WITH SIMULTANEOUS WATCH AND RECORD CAPABILITIES

CROSS-REFERENCE TO RELATED APPLICATIONS

This application is a continuation of U.S. patent application Ser. No. 11/894,622, filed Aug. 20, 2007, which is a continuation of U.S. patent application Ser. No. 11/154,065, filed Jun. 15, 2005, now abandoned, which is a continuation of U.S. patent application Ser. No. 10/723,586, filed Nov. 24, 2003, now abandoned, which is a continuation of U.S. patent application Ser. No. 09/329,850, filed Jun. 11, 1999, now abandoned, which claims the benefit of U.S. Provisional Patent Application No. 60/089,487, filed Jun. 16, 1998, the disclosures of which are hereby incorporated by reference herein in their entireties.

BACKGROUND OF THE INVENTION

This invention relates to interactive television program guides, and more particularly, to television program guides that allow users to record one program while simultaneously watching a different program.

Interactive program guides are typically implemented on set-top boxes. The program guides implemented on set-top boxes allow users to view television program listings. In addition, some program guides allow the user to select a program to be recorded. When the selected program begins, the program guide tunes the set-top box to the channel showing the program and directs a videocassette recorder ("VCR") to begin recording. At the end of the selected program, the program guide stops the recording process.

A significant disadvantage to the program guides that are currently available is that they are generally based on set-top boxes that contain one tuner (although set-top boxes containing two tuners have been proposed). A program may be selected for recording using such one-tuner program guides, however, a viewer is unable to watch one program while simultaneously recording another.

What is needed is a more sophisticated program guide that can perform an allocation function amongst multiple tuners or a single tuner in conjunction with a RF bypass switch inside a set-top box or alternatively, outside the set-top box to allow a viewer to watch one program while simultaneously recording another program.

It is therefore an object of the present invention to provide an interactive television program guide system which allows a user to record one program while simultaneously watching another program.

SUMMARY OF THE INVENTION

The present invention provides the user of an interactive television program guide with the ability to watch one program while simultaneously recording another. The user may select a television program to be recorded by viewing the interactive television program guide's program listings display screen and making a selection using a remote control device. The selection is then stored in memory that resides in the set-top box or some other suitable device such as a satellite receiver, an advanced television with a processor and memory or a computer.

If the set-top box is equipped with multiple tuners, the interactive television program guide will allocate one of the tuners for recording, the program when it is time for the program to start. However, if all of the tuners are in use, which may be the case if the viewer is watching one program and using a picture-in-picture ("PIP") feature to view another program or to display additional text or graphics by using some other secondary tuner function feature that requires a tuner to operate, the interactive television program guide may allocate a tuner for the recording function if the user indicates that he is no longer interested in using the PIP or another secondary tuner function or if the tuner allocation scheme dictates it do so. Alternatively, if the set-top box is equipped with two tuners, one may be dedicated for television viewing and interactive television program guide user features, while the other tuner may be dedicated for recording use only.

The present invention may also be practiced using a set-top box system having a single tuner and a radio-frequency ("RF") bypass or digital switch. With such a system, the interactive television program guide allocates use of the single tuner output and controls the switch output to provide a watch and record environment for the user.

BRIEF DESCRIPTION OF THE DRAWINGS

The invention, together with its various features and advantages, can be readily understood from the following more detailed description taken in conjunction with accompanying drawings.

DETAILED DESCRIPTION OF THE PREFERRED EMBODIMENTS

Figure 1A:
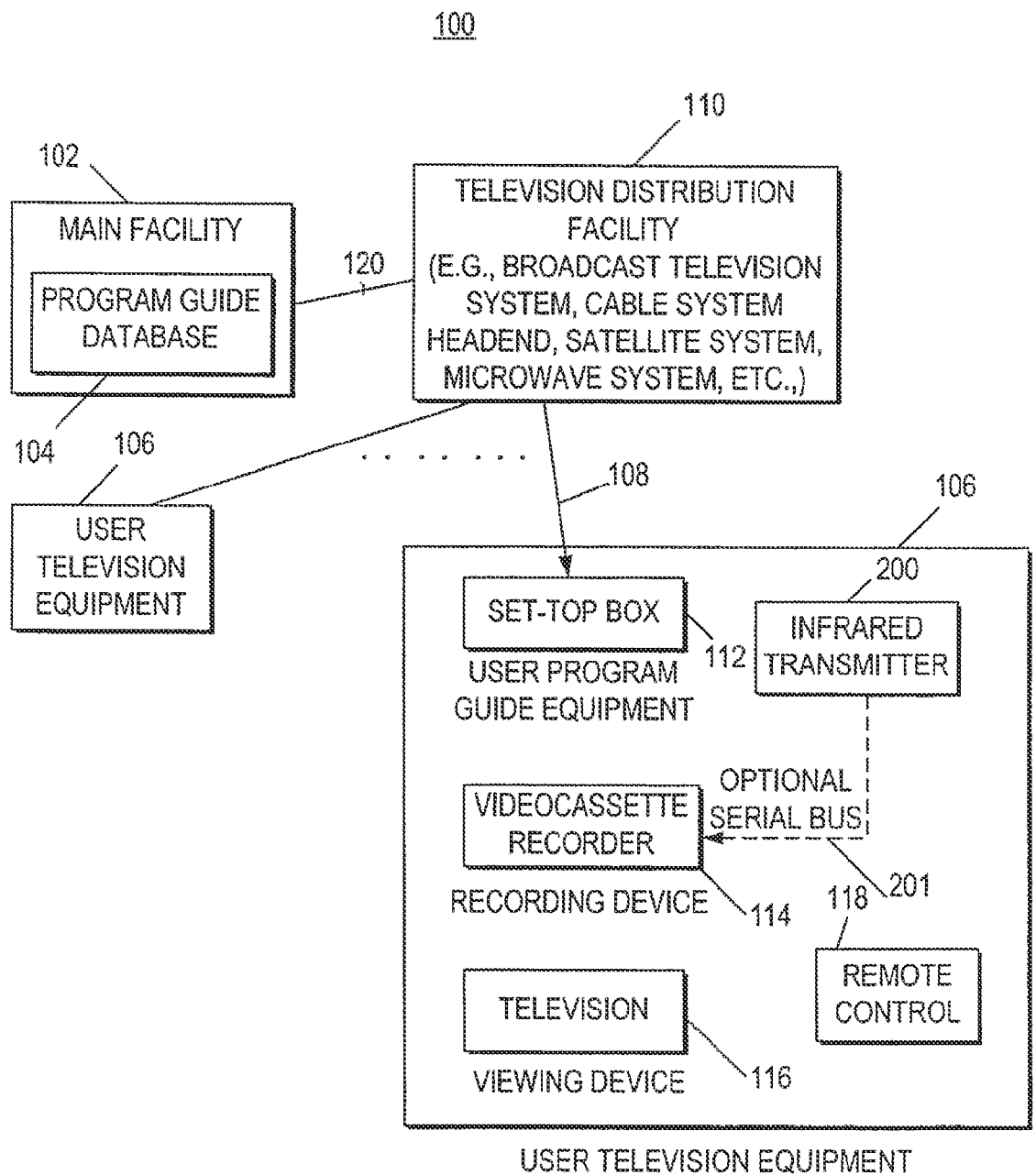
FIG. 1(a) is a diagram of an illustrative interactive television program guide system in which an interactive television program guide is implemented in accordance with the present invention.
Figure 1B:
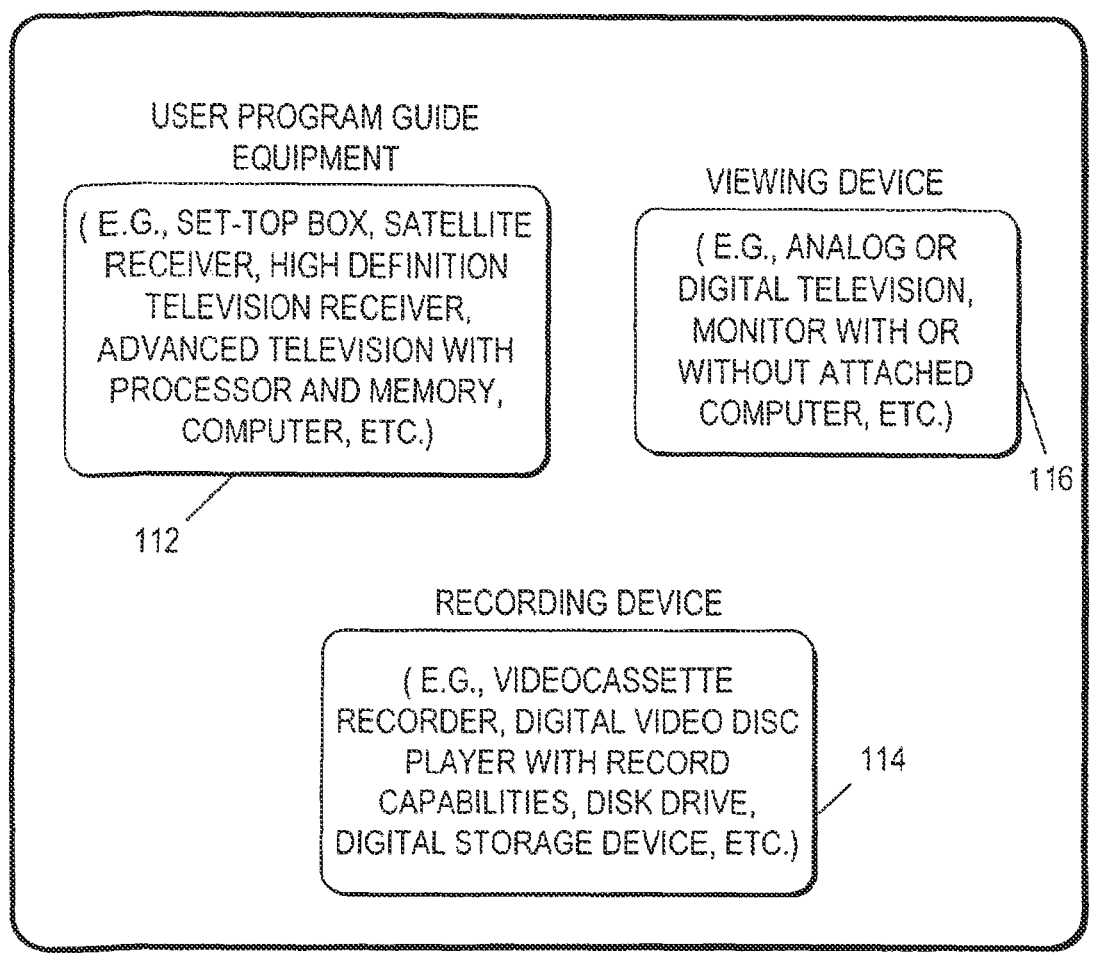
FIG. 1(b) is a diagram of the user television equipment that includes alternative devices for the user program guide equipment, recording device and viewing device.

FIG. 1(a) shows an illustrative interactive television program guide system 100 in accordance with the present invention. Main facility 102 contains a program guide database 104 for storing program guide information such as television program guide listings data, pay-per-view ordering information, television program promotional information, etc. Information from database 104 may be transmitted to multiple television distribution facilities 110 via communications link 120. Only one such facility 110 is shown in FIG. 1 to avoid over-complicating the drawing. Communications link 120 may be a satellite link, a telephone network link, a cable or fiber optic link, a microwave link, a combination of such links, or any other suitable communication path. If it is desired to transmit video signals over link 120 in addition to data signals, a relatively high bandwidth link such as a satellite link is generally preferable to a relatively low bandwidth link such as a telephone line. Television distribution facility 110 is a facility for distributing television signals and data to users, such as a cable system headend, a broadcast distribution facility, or a satellite television distribution facility.

The program guide information transmitted by main facility 102 to television distribution facility 110 includes television program listings data for current and future television programs. The television program listings data for each program preferably includes the title of the program, the channel for the program, a scheduled broadcast time (start time) and an ending time or the duration of the program. Other typical program listings data includes ratings, critics ratings, descriptions, genres (sport, movies, children, etc.), actors, etc. Transmitted program information may also include advertising information and pay program data such as pricing information for individual programs and subscription channels, telephone numbers for placing orders that cannot be impulse ordered, etc.

Television distribution facility 110 distributes television programming and program guide information to the user television equipment 106 of multiple users via communications paths 108. For example, television programming may be distributed over analog television channels and program guide data may be distributed over an out-of-band link on paths 108. Data distribution may also involve using one or more digital channels on paths 108. Such digital channels may also be used for distributing television programming and other information. Multiple television and audio channels (analog, digital, or both analog and digital) may be provided to set-top boxes 112 via communication paths 108. If desired, program listings and other information may be distributed by one or more distribution facilities that are separate from television distribution facility 110 using communications paths that are separate from paths 108.

Certain functions such as pay program purchasing may require set-top boxes 112 to transmit data to television distribution facility 110 over communications paths 108. If desired, such data may be transmitted over telephone lines or other separate communications paths. If functions such as these are provided using facilities separate from television distribution facility 110, some of the communications involving set-top boxes 112 may be made directly with the separate facility.

Each user has user program guide equipment that acts as a receiver. The user program guide equipment is typically a set-top box such as set-top box 112, but which may be other suitable television equipment into which circuitry similar to set-top box circuitry has been integrated. Program guide data is distributed to set-top boxes 112 periodically, continuously or on demand. Television distribution facility 110 may also poll set-top boxes 112 periodically for certain information (e.g., pay program account information or information regarding programs that have been purchased and viewed using locally-generated authorization techniques). Main facility 102 preferably contains a processor to handle information distribution tasks. Each set-top box 112 preferably contains a processor to handle tasks associated with implementing a interactive television program guide application on the set-top box 112. Television distribution facility 110 may contain a processor for tasks associated with monitoring a user's interactions with the interactive television program guide implemented on set-top boxes 112 and for handling tasks associated with the distribution of program guide data and other information to user television equipment 106.

Each set-top box 112 is typically connected to an optional recording device such as videocassette recorder (VCR) 114 or other suitable recording device, so that selected television programs may be recorded. VCR 114 may be connected to television 116 (or other suitable viewing device such as a monitor) or set-top box 112 may be connected to television 116 (or other suitable viewing device). To record a program, set-top box 112 tunes to a particular channel and sends control signals via infrared (IR) transmitter 200, other suitable control paths such as a hard-wired link or serial bus 201 to VCR 114. The control signals direct VCR 114 to start and stop recording at the appropriate times.

During use of the interactive television program guide implemented on set-top box 112, television program listings and other information may be displayed on television 116. Such interactive television program guide displays may be overlaid on top of a television program to which the user has tuned with set-top box 112 or may be displayed in place of such a program. Each set-top box 112, VCR 114, and television 116 may be controlled by one or more remote controls 118 or any other suitable user input interface such as a wireless keyboard, mouse, trackball, dedicated set of buttons, voice recognition system etc. Remote controls such as remote control 118 have various buttons that may be pressed by the user such as cursor keys (for on-screen movement of a highlighted region, scrolling functions, etc.), an enter key (for making a selection), channel number keys (for selecting functions related to user preferences), etc.

FIG. 1(*b*) shows alternative devices that may be used in implementing the interactive television program guide. The interactive television program guide may be implemented on user program guide equipment that includes a set-top box, advanced television receiver with a microprocessor and memory, a personal computer with or without one or more tuners, a satellite receiver, a high definition television ("HDTV") receiver, or any other suitable television reception and data processing device. A suitable personal computer arrangement may contain a tuner card that contains suitable analog and digital tuning circuitry to perform the simultaneous watch and record features. A tuner card may contain two analog tuners that both receive television program signals from the television input signal and are controlled by the interactive television program guide. Typically a digital tuner for the interactive television program guide system may contain an analog tuner, a decoder such as a Motion Pictures Experts Group ("MPEG") MPEG-2 decoder, a demodulator such as a quadrature amplitude modulation ("QAM") demodulator, and a demultiplexer such as a MPEG-2 demultiplexer that is used to extract the portion of the television input signal that is desirable to the user and corresponds to a particular television program or channel. Alternatives for the recording device include a videocassette recorder, a digital versatile disk or digital video disk ("DVD") player with recording capabilities, a digital storage device such as a disk drive or other suitable digital storage device that may or may not be part of the computer, or any other suitable recording device. The recording device may also be a videocassette recorder controlled by the computer. Alternatives for the viewing device include a television, a monitor with or without an attached computer, or the viewing equipment portion of a personal computer-television (PC/TV). The viewing device may also be an analog or digital television.

Figure 2A:
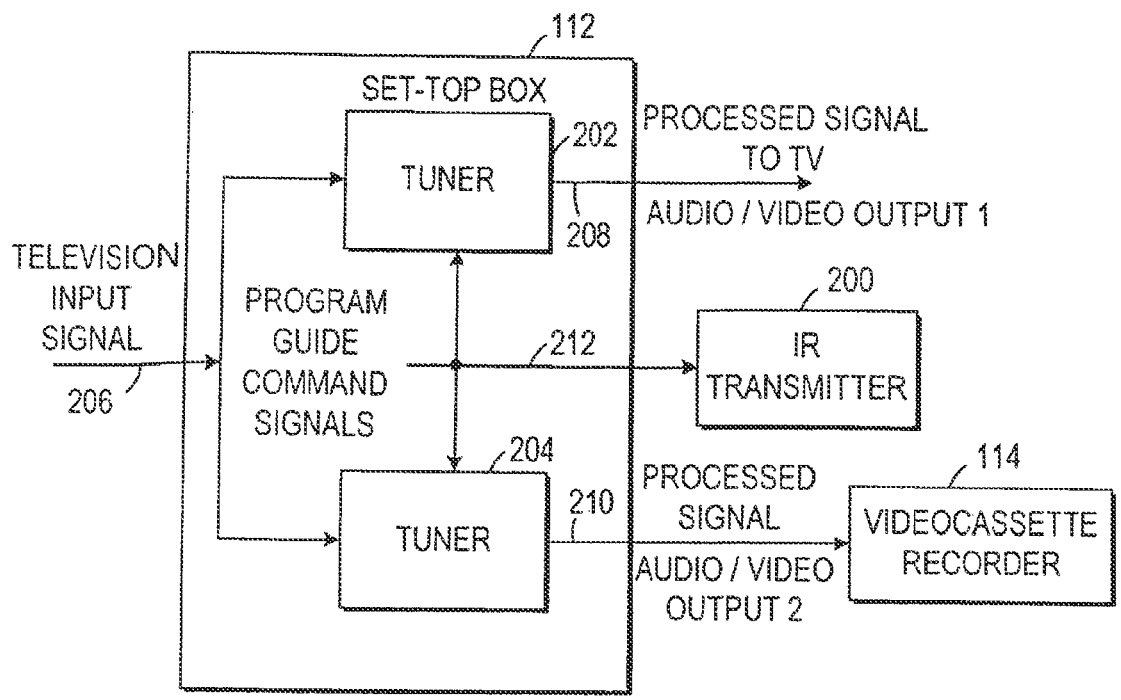
FIG. 2(a) is a diagram of an illustrative interactive television program guide system that includes a two-tuner set-top box in which the output of each tuner is connected directly into an external device in accordance with the present invention.
Figure 2B:
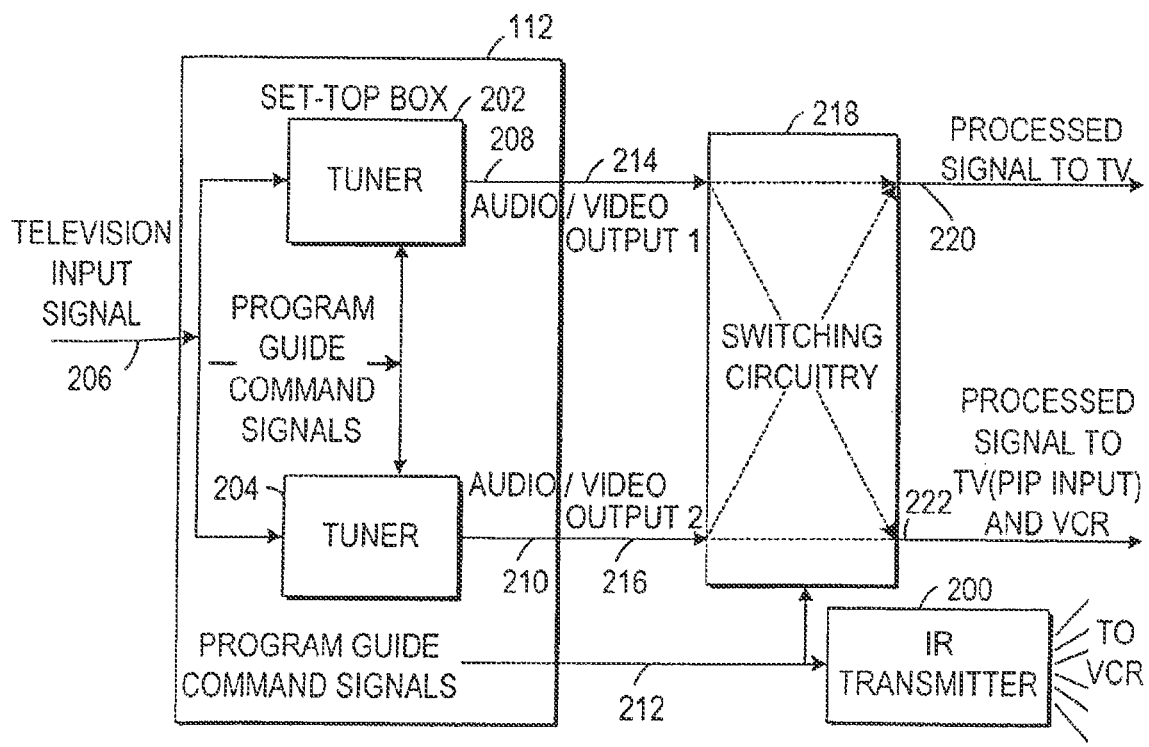
FIG. 2(b) is a diagram of an illustrative interactive television program guide system that includes a two-tuner set-top box in which the output of each tuner is connected to switching circuitry in accordance with the present invention. The outputs of the switching circuitry are connected to external devices.

FIG. 2(*a*) shows an illustrative two-tuner set-top box 112. The television input signal 206 may be received from a cable connected to a cable system headend or from an antenna that receives satellite television transmissions. Television signals may also be received that are distributed, for example, by terrestrial wireless communications systems such as microwave-based communications systems or the like. If desired, television signals may be received from conventional broadcast television systems. Television-like signals may be received over the Internet (e.g., using video compression techniques). Television signals from these sources or any other such suitable sources may be combined if desired. Television signals may be analog or digital (e.g., in the MPEG-2 format or the like). A television input signal that has not been processed by a tuner or decoder in the program guide equipment is referred to herein as a raw signal.

The unprocessed television input signal on line 206 is provided to set-top box 112. The unprocessed television input signal on line 206 is then received by tuner 202 and tuner 204 which process this signal by decoding it and tuning to desired television channels. The television input signal on line 206 is typically an analog television signal and the invention will generally be described in this context. However, the principals of the present invention also apply to set-top boxes that receive digital television signals as well. The principals of the present invention apply to satellite receivers, cable set-top boxes, and other devices suitable for the reception of television signals such as microwave television receivers, or broadcast television system receivers. However, for clarity the present invention will be described primarily in the context of cable set-top boxes. Tuner outputs 208 and 210 of each tuner are respectively connected to audio/video output 1 and audio/video output 2 of set-top box 112. Audio/video output 1 and audio/video output 2 may be connected to external devices such as either a television or VCR. Formats for audio/video output 1 and audio/video output 2 may include RF or baseband analog, MPEG-2 carried on an IEEE 1394 bus, or any other suitable format.

In this example, audio/video output 204 is connected to VCR 114. Accordingly, with the arrangement of FIG. 2(*a*), the interactive television program guide always uses the same tuner for recording functions, because tuner 204 is dedicated for that purpose. However, VCR 114 may be connected to either audio/video output 1 or audio/video output 2 so that if VCR 114 is connected to audio/video output 1, tuner 202 will be used exclusively for recording.

FIG. 2(*a*) also shows that the interactive television program guide system may include an external IR transmitter 200 for communicating with VCR 114. External IR transmitter 200 receives interactive television program guide command signals from set-top box 112 on line 212. Although in FIG. 2(*a*) and other drawings, IR transmitter 200 is depicted as being external to the set-top box 112, this configuration may be modified if desired by using a set-top box that includes an internal IR transmitter capable of transmitting an infrared signal at an optimal trajectory such that it is effectively received by external devices such VCR 114 and television 116. IR transmitter 200 may be optimally positioned so that VCR 114 will receive the IR signal effectively. Alternatively, the interactive program guide system may include two IR transmitters, one for VCR 114 and one for television 116 or other equipment for communicating with the recording device such as optional serial bus 201. The interactive television program guide command signals on line 212 that are provided to IR transmitter 200 allow channel selection requests and VCR start and record commands to be sent from the interactive television program guide in set-top box 112 to VCR 114. The interactive television program guide commands that are sent to VCR 114 are based on the user's interactions with the interactive television program guide (i.e., to select programs for recording, etc).

Figure 3A:
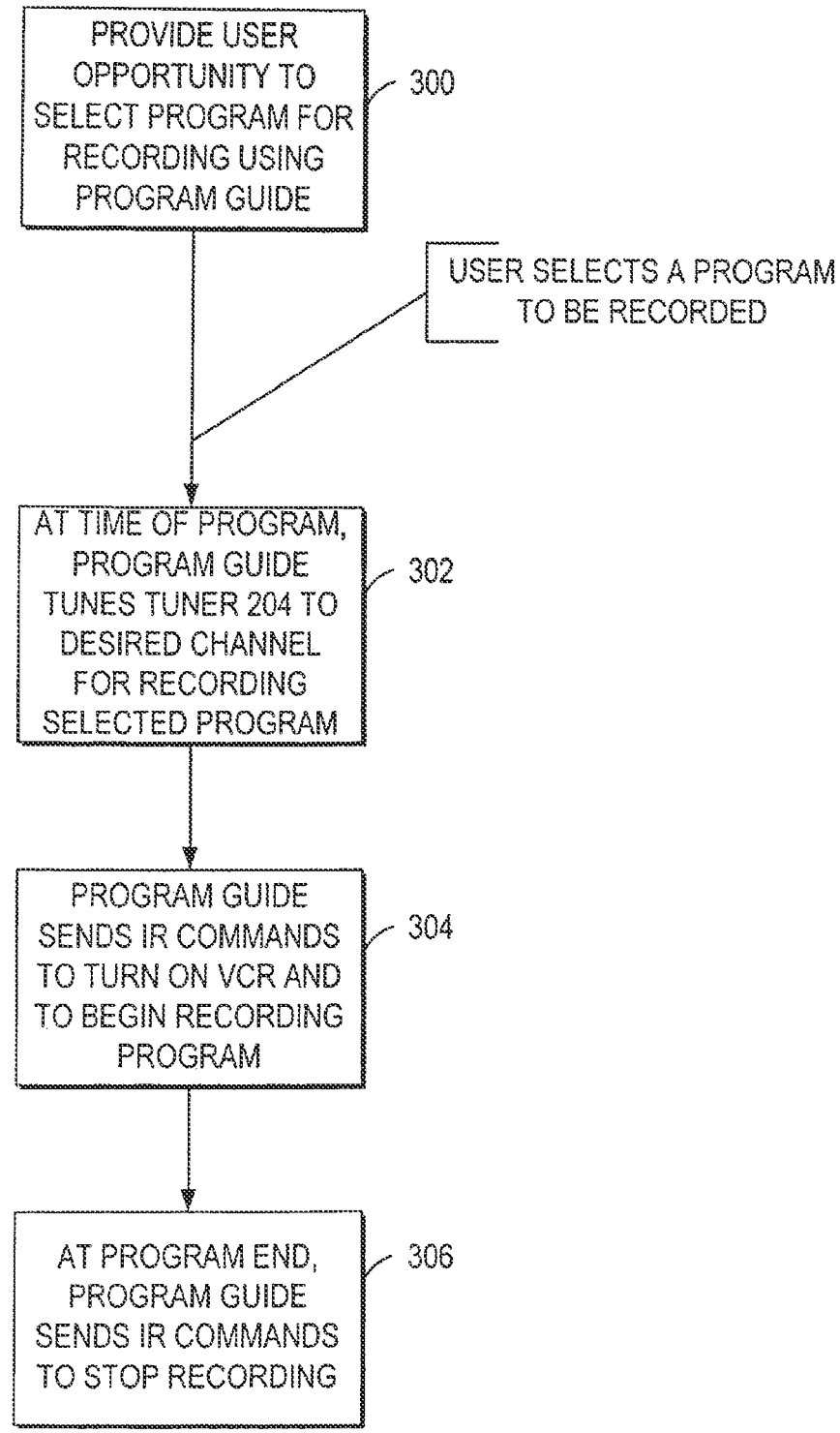
FIG. 3(a) is a flow chart that illustrates steps involved in using an interactive television program guide system that includes a set-top box that has two tuners of the type shown in FIG. 2(a) in accordance with the present invention.
Figure 3B:
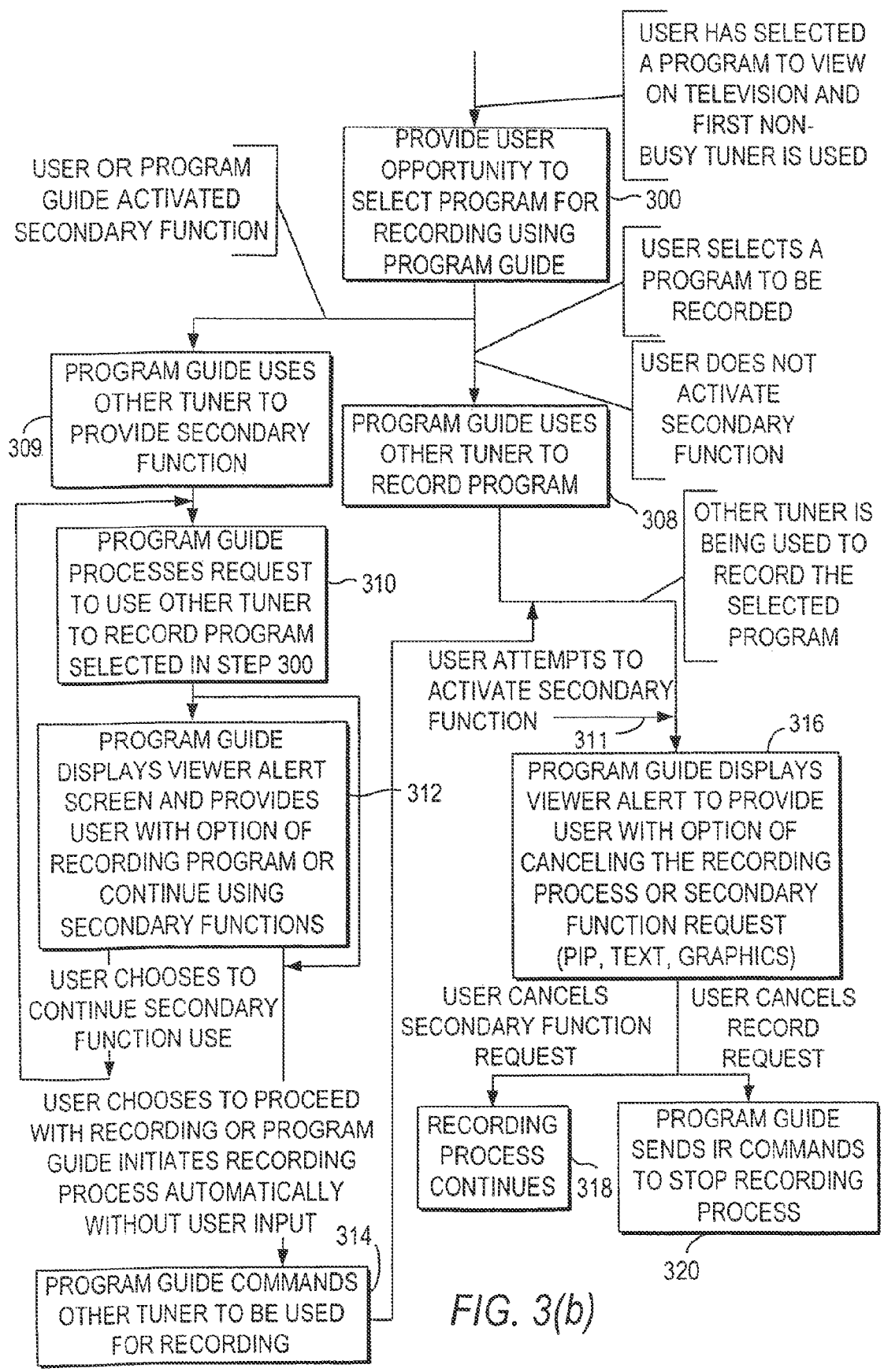
FIG. 3(b) is a flow chart that illustrates steps involved in using an interactive television program guide system that includes a set-top box that has two tuners and switching circuitry of the type shown in FIG. 2(b) in accordance with the present invention.

FIG. 3(*a*) is a flow chart showing steps involved in using an interactive television program guide system having a set-top box configuration such as shown in FIG. 2(*a*). At step 300, the interactive television program guide provides the user with an opportunity to select a program to be recorded at some later time. The user may select a program to be recorded from a interactive television program guide screen such as interactive television program guide program selection screen 400 of FIG. 4(*a*), which the interactive television program guide displays on the user's television. By entering a selection using remote control 118, the user may select a program to be recorded. The user may enter a selection into remote control 118 by using the up and down cursor buttons on remote control 118 to highlight the desired selection with a highlight region such as highlight region 402. In the example depicted in FIG. 4(*a*), program 10, is being selected for recording at 7:30 on channel 4. The user may initiate recording by pressing a remote control "record" button or by pressing an "OK" button followed by appropriate responses to various on-screen menus generated by the interactive television program guide.

At step 302 of FIG. 3(*a*), the interactive television program guide sends commands to tuner 204 of FIG. 2(*a*) at the time the program selected after step 300 is about to begin. These commands allow the interactive television program guide to tune tuner 204 to the channel of the program selected for recording.

At step 304, the interactive television program guide sends commands via IR transmitter 200 that direct VCR 114 of FIG. 2(*a*) begin recording. Optionally, the interactive television program guide may send commands that direct VCR 114 to turn on if necessary. While tuner 204 of FIG. 2(*a*) is being used to record the selected program, tuner 202 may be used to view any program made available to the user on television input signal 206 by television distribution facility 110. In addition, the user may use the interactive television program guide without any limitations as to which tuner-related features of the interactive television program guide may be used. This two-tuner set-top box system provides a system by which the user may simultaneously watch one program and record another.

At step 306 of FIG. 3(*a*), the interactive television program guide sends IR commands to VCR 114 at the end of the recorded program. These IR commands instruct VCR 114 to stop recording. Optionally, the interactive television program guide may send commands that direct VCR 114 to turn off if necessary.

FIG. 2(*b*) shows another illustrative arrangement of a two-tuner set-top box 112. The arrangement of FIG. 2(*b*) allows the interactive television program guide to allocate whichever tuner is not currently busy for recording a selected program when that program is about to begin. Outputs 208 and 210 of tuners 202 and 204 respectively, of FIG. 2(*b*) are connected to inputs 214 and 216, respectively, of switching circuitry 218. Switching circuitry 218 is controlled by interactive television program guide command signals on line 212. Switching circuitry 218 has two outputs 220 and 222. Each of the switching circuitry outputs 220 and 222 may be connected to at least one external device such as television 116 or VCR 114. The arrangement of FIG. 2(*b*) is similar to the arrangement of FIG. 2(*a*), except that the FIG. (*b*) arrangement has switching circuitry that allows the interactive television program guide to switch tuner outputs so that each external device may receive output from either tuner 202 or tuner 204, whereas the arrangement in FIG. 2(*a*) only allows the tuner outputs to be dedicated to one external device or another. Further, in the configuration of FIG. 2(*b*), both switching circuitry outputs 220 and 222 are connected to television 116 and output 222 is also connected to VCR 114. Output 220 is connected to the regular television input and Output 222 is connected to the Picture-In-Picture input or some other auxiliary television input. This configuration allows the user to use secondary functions such as PIP while viewing television 116. Alternatively, the picture-in-picture output from one tuner may be combined internally in the set-top box with the processed signal output from the other tuner to create one output that is connected to television 116.

FIG. 3(*b*) shows a flow chart of steps involved in using an interactive television program guide system having a set-top box configured as shown in FIG. 2(*b*). Before step 300, a user may use the interactive television program guide to select a particular television program for viewing. The interactive television program guide commands a first non-busy tuner to direct its output to television 116 for user viewing. At step 300, the interactive television program guide provides the user with an opportunity to select a program to be recorded. The user may also activate a secondary function for the set-top box tuner such as a picture-in-picture function or the interactive television program guide may utilize that tuner for another secondary function such as collecting program guide data, browsing the Internet, playing a particular music channel, using interactive services or running a background process.

Figure 3C:
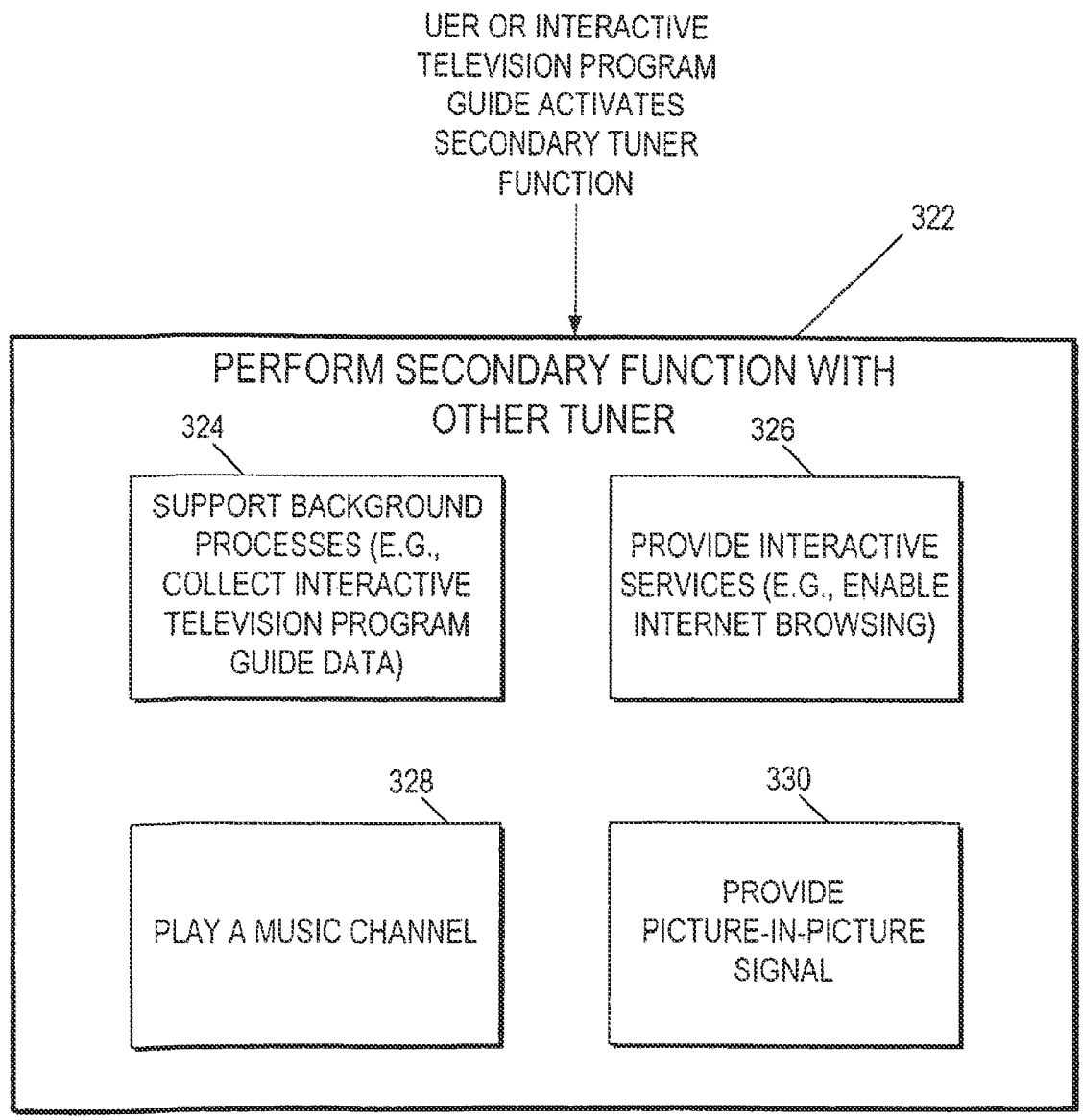
FIG. 3(c) is an illustrative flow chart showing steps involved in providing a secondary function in accordance with the present invention.

As shown in FIG. 3*c*, when a user activates a secondary tuner function, the tuner for that function (e.g., the tuner other than the first non-busy tuner) may perform that secondary tuner function at step 322. Step 322 may also involve non-user activated secondary tuner functions such as step 324 that provides support for background processes. A background process supported may be collecting interactive television program guide data. Step 324 may be performed, for example, by tuning the other tuner to a channel on which interactive television program guide data is provided from main facility 102 via television distribution facility 110 on one of communications paths 108 connecting television distribution facility 110 to user television equipment 106 or more specifically to user program guide equipment 112. Step 324 may also involve using the other tuner to provide interactive services such as enabling Internet browsing at step 326. Internet browsing may involve accessing the Internet by launching a Internet browser and connecting to the Internet using the other tuner over a data channel on one of communications paths 108 linking user program guide equipment 112 to television distribution facility 110. Television distribution facility 110 may contain a server or other suitable equipment for completing a connection to the Internet. Step 322 may also involve step 328 of playing a music channel or to obtain information for that channel. In step 328, the other tuner may be used in tuning to a digital music channel provided from television distribution facility 110. Aspects of the use of multiple tuners to obtain in-band information for analog and digital music channels are described in Ellis U.S. patent application Ser. No. 09/330,860, filed concurrently herewith, which is hereby incorporated by reference herein in its entirety. If desired, the other tuner may be used to provide a picture-in-picture signal at step 330.

Returning to FIG. 3*b*, if the user decides to activate a secondary function such as PIP before the interactive television program guide begins to record the program that was selected for recording at step 300, the other tuner is used to provide the secondary function at step 309. Thus following step 309, both tuners are in use. The user is watching television with the first tuner while the second (other) tuner is being used to provide a secondary function such as PIP. At step 310, the interactive television program guide processes the request to record the program selected at step 300.

Figure 4A:
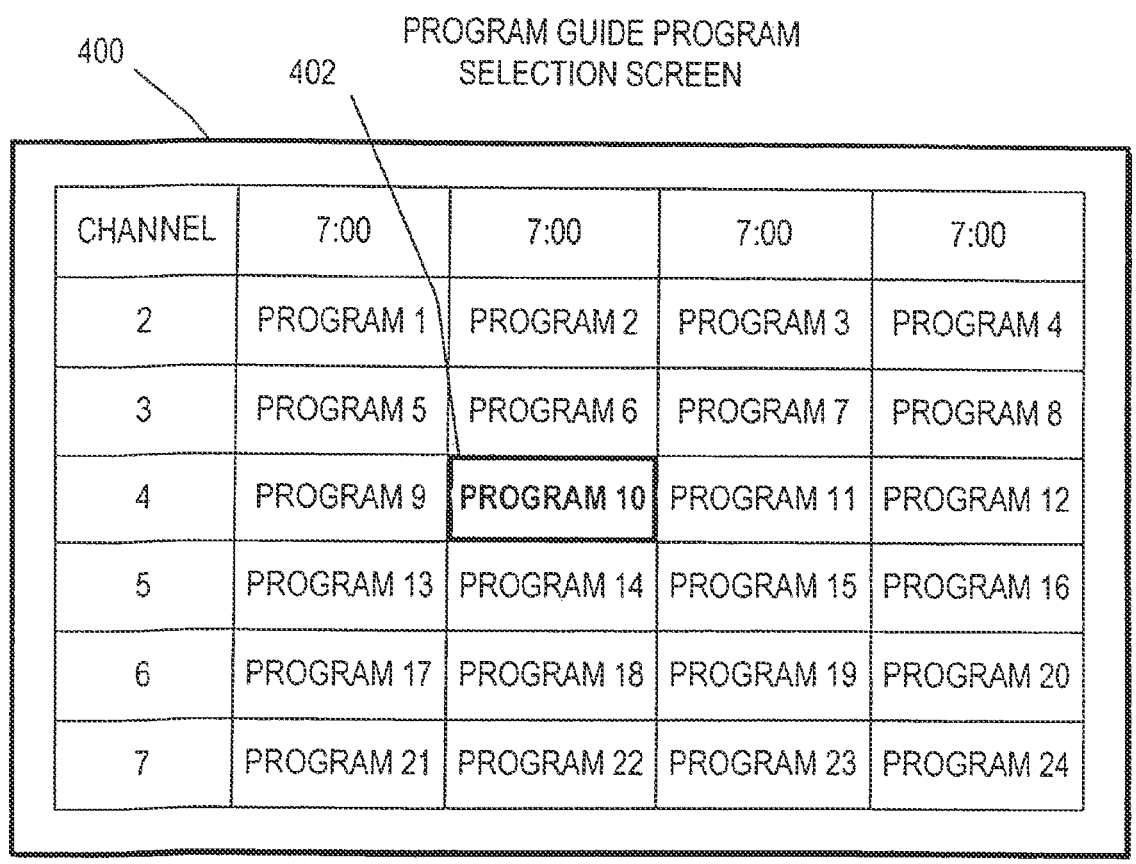
FIG. 4(a) is an illustrative interactive television program guide selection screen that may be provided on a user's television in accordance with the present invention.
Figure 4B:
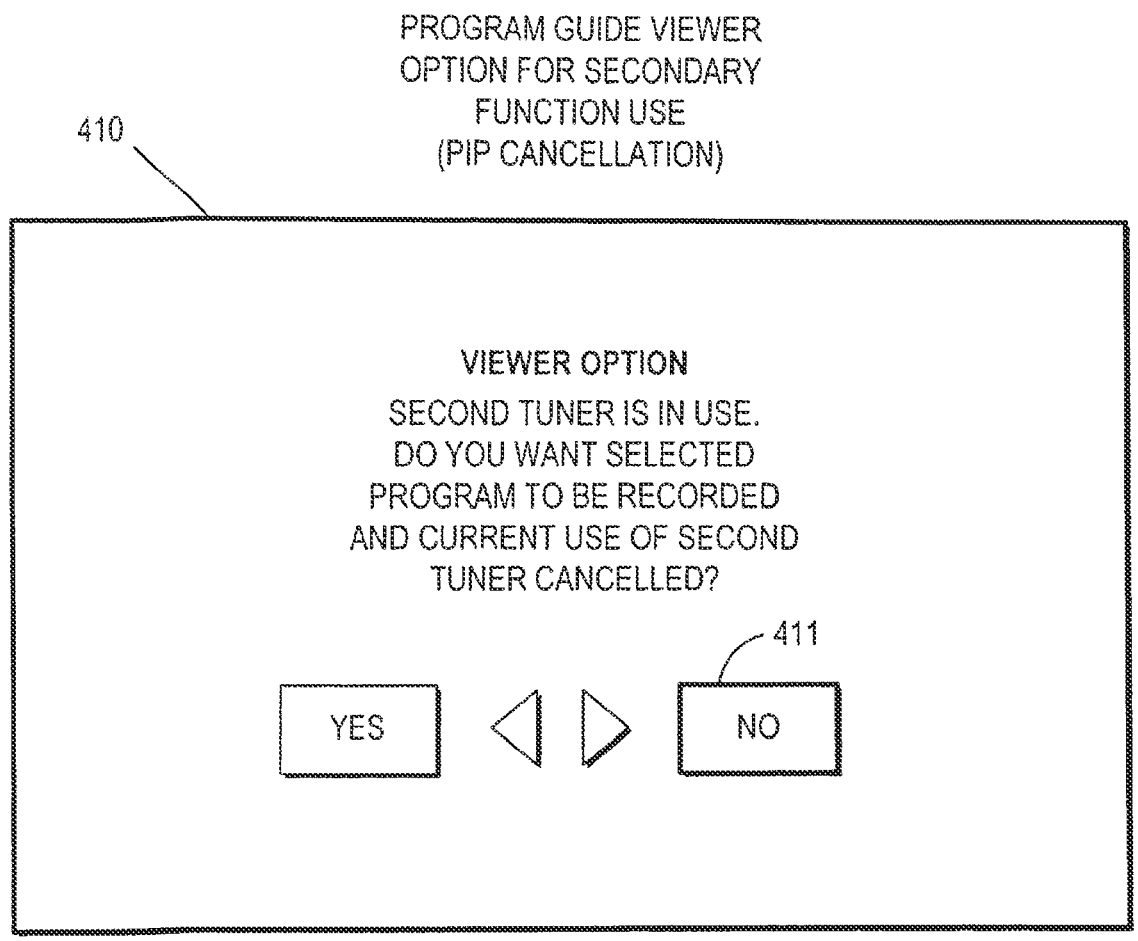
FIG. 4(b) is an illustrative interactive television program guide viewer option selection screen for use in canceling a picture-in-picture function or other secondary user functions in accordance with the present invention.

At step 312, after the record request is processed the interactive television program guide displays viewer option for secondary function use (PIP cancellation) display screen 410 as shown in FIG. 4(b) which provides the user with an opportunity to either initiate the recording process or to continue using secondary functions that involve supplying PIP or additional text or graphics that overlay the display of television 116. The user, who is already watching television using the first non-busy tuner, may indicate a desire to continue using the other tuner for secondary functions by selecting "No" on the viewer option for secondary function use (PIP cancellation) display screen 410 with highlight region 411. This selection can be made by using remote control 118. If the user selects "No," the interactive television program guide will continue to direct the other tuner to be used for secondary function use. Alternatively, the user may cancel the secondary function use on the other tuner and may initiate the recording process using the other tuner by selecting "Yes" on viewer option for secondary function use (PIP cancellation) display screen 410. If the interactive television program guide does not receive a "Yes" or "No" selection from the user, the interactive television program guide will terminate the secondary function use on the second tuner and proceed with the recording process. Further, if the second tuner is being used for an secondary function such as data collection that requires no user input, the interactive television program guide will automatically terminate that function without displaying a viewer alert screen.

At step 314, after the user has chosen to proceed with the recording process, the output of the other tuner is directed to VCR 114 by switching circuitry 218 and used to record the selected program. The interactive television program guide tunes the other tuner to the channel on which the selected program will be broadcast and sends IR commands to VCR 114 to start recording.

If the user decides not to activate a secondary function such as PIP before the interactive television program guide begins to record the program that was selected for recording, the interactive television program guide uses the other tuner to record the selected program at step 308. Thus, following step 308, both tuners are in use. The user is watching television with the first tuner while the second (other) tuner is being used to record the selected program. If the user attempts to activate a secondary function as shown at point 311 in FIG. 3(b), the interactive television program guide displays viewer option for secondary function use (recording cancellation) display screen 420 at step 316 as shown in FIG. 4(c) which gives the user the option to either cancel the recording process and allocate the other tuner for secondary function use or to continue the recording process and cancel the secondary function request.

Figure 4C:
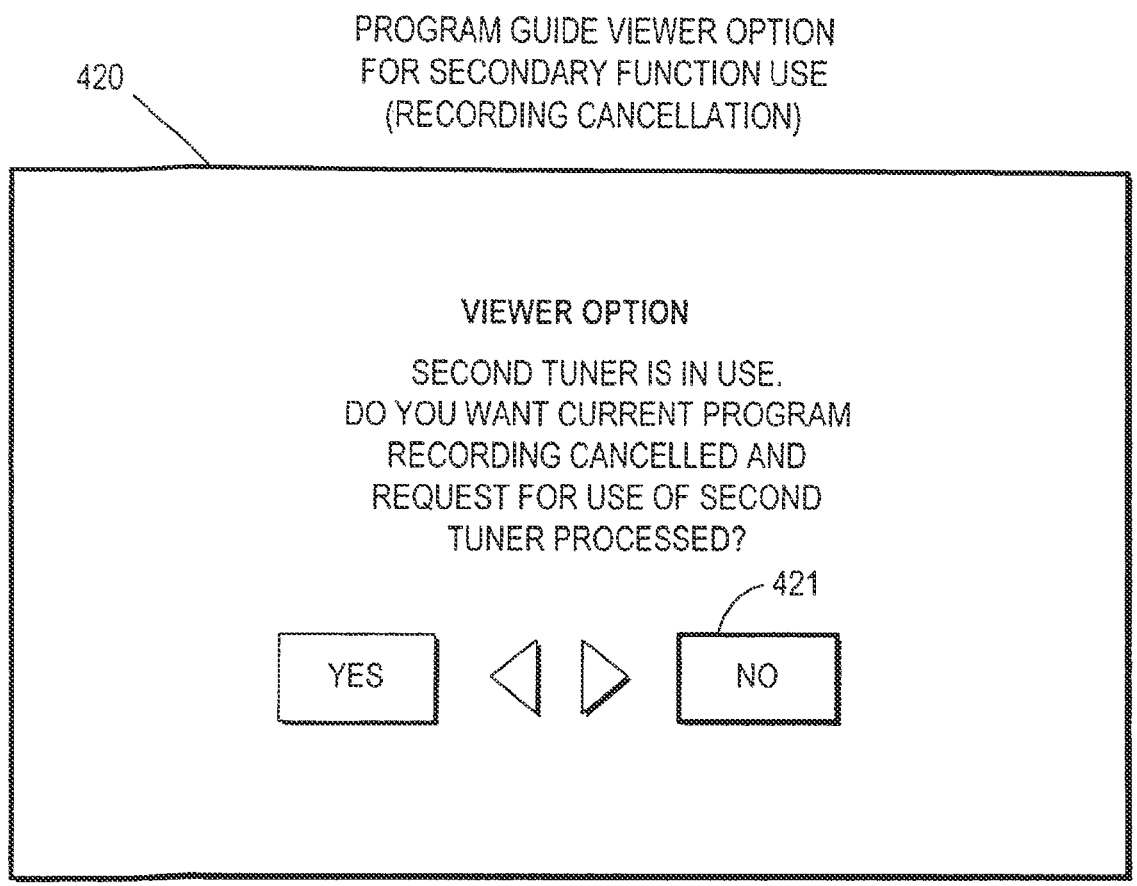
FIG. 4(c) is an illustrative interactive television program guide viewer option selection screen for use in the cancellation of a scheduled recording in accordance with the present invention.

If the user cancels the secondary function request (using, e.g., highlight region 421 of FIG. 4(c)) to select "No" in viewer option for secondary function use (recording cancellation) display screen 420, the interactive television program guide continues the recording process on the other tuner at step 318.

If the user cancels the record request by selecting "Yes" in viewer option for secondary function use (recording cancellation) display screen 420, the interactive television program guide allocates the other tuner for secondary function use at step 320. In step 320, the interactive television program guide sends IR commands to VCR 114 to direct VCR 114 to stop recording.

FIG. 4(a) shows an illustrative interactive television program guide selection screen 400 that may be displayed on television 116 when the user enters commands into remote control 118 that direct the interactive television program guide to be displayed. The user may use remote control 118 to select a desired program for recording. Interactive television program guide selection screen 400 provides the user with an opportunity to view program listings for current and future programs as well as to initiate the recording process by selecting a program to be recorded. FIG. 4(a) depicts an example in which the user has selected program 10 for recording with highlight region 402. Program 10 will be broadcast on channel 4 at 7:30. This means that at 7:30 the interactive television program guide uses either a set-top box tuner or the internal tuner of VCR 114 to tune to channel 4 before initiating the record sequence. This record sequence may be performed while the user is watching a television program different from the program being recorded.

FIG. 4(b) shows an illustrative interactive television program guide viewer option for secondary function use (PIP cancellation) screen 410 which acts to alert the viewer to a conflict in tuner allocation and usage. Screen 410 may be displayed by the interactive television program guide on user television 116 when the second or "other" tuner chosen by the interactive television program guide to record the selected program is already in use performing a secondary function such as PIP and the first tuner is being used for viewing television 116. Screen 410 provides the user with an opportunity to continue using the second tuner for the secondary function and to cancel the record request or to cancel the secondary use and to proceed with the record request. If the user still desires to have the program recorded, the user will select "Yes." The interactive television program guide will then redirect the use of the second tuner and initiate the record sequence. If the user desires to continue using the secondary function, the user will select "No." The interactive television program guide will then cancel the record request and allow the user to continue using the second tuner for any of the available secondary functions.

FIG. 4(c) shows illustrative interactive television program guide viewer option for secondary function use (record cancellation) display screen 420 which acts to alert the viewer to a conflict in tuner allocation and usage. Screen 420 may be displayed by the program on television 116 when the second or "other" tuner chosen by the interactive television program guide is asked to perform a secondary function but that tuner is already busy performing the record function and the first tuner is being used for viewing television 116. Screen 420 provides the user with the option to continue using the second tuner for recording the selected program and canceling the request for use of the other tuner for performing a secondary function or to cancel the current recording and to process the secondary function request. If the user desires to have the recording process canceled, the user will select "Yes." The interactive television program guide will then redirect the use of the second tuner and process the secondary function request. If the user desires to continue the recording process, the user will select "No." The interactive television program guide will then cancel the secondary function request and allow the user to continue using the second tuner for recording the selected program.

Figure 5:
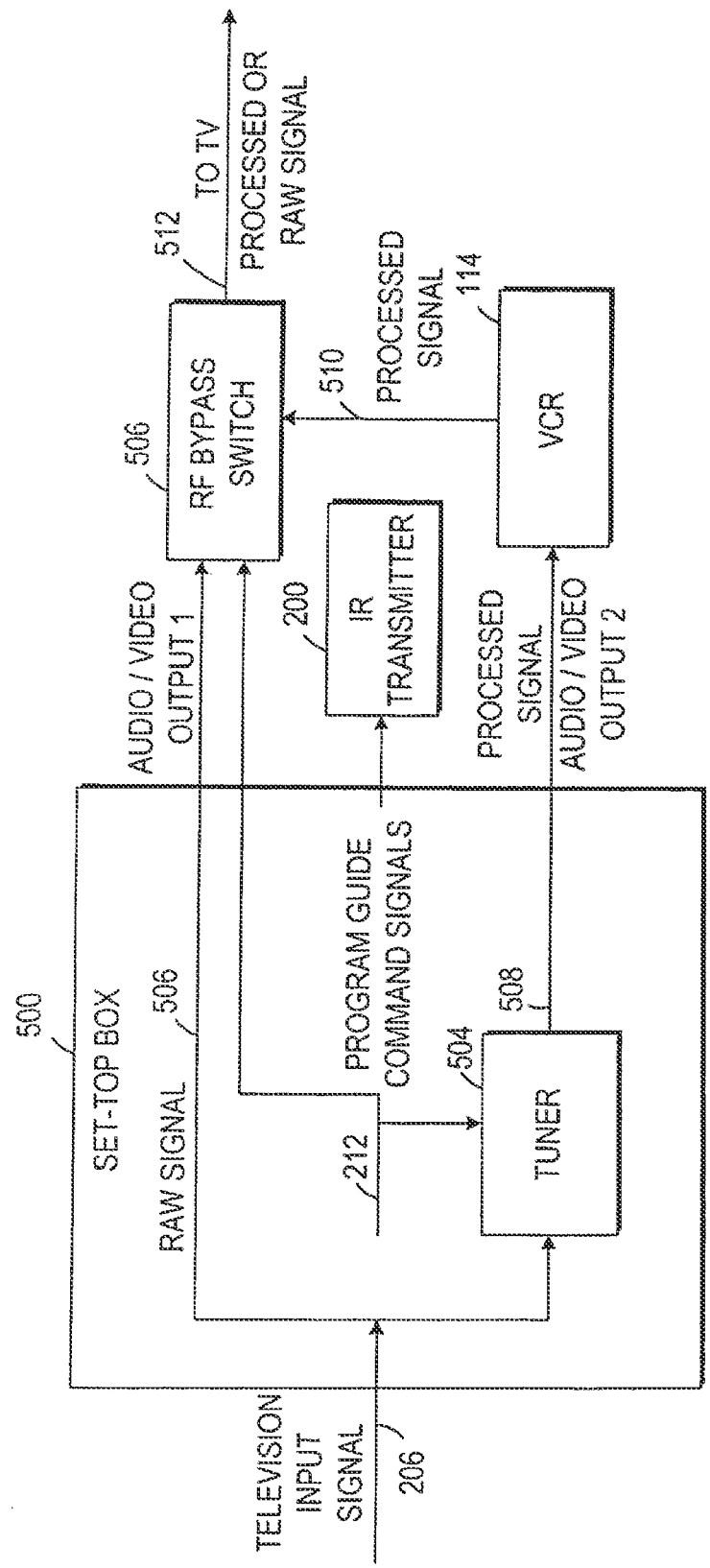
FIG. 5 is a diagram of an illustrative interactive television program guide system that includes a set-top box with one tuner, an external radio frequency (RF) bypass switch, and an external infrared (IR) transmitter, and where the set-top box tuner output is received by a videocassette recorder (VCR) in accordance with the present invention.

FIG. 5. shows the first of four illustrative configurations involving a single-tuner set-top box 500 that has an RF bypass switch. If desired, the functions of the RF bypass switch may be provided by a digital switch. The RF bypass switch may be incorporated as part of the input circuitry on either the viewing or recording devices and functionally perform the same as RF bypass switch 502. RF bypass switch 502 allows raw cable input 506 to be passed through to an external device such as television 116 without being processed. RF bypass switch 502 not only receives raw signal 506, but it receives processed signal 508 as well. Processed signal 508 is output from tuner 504 and into VCR 114. Processed signal 508 passes through VCR 114 and is output as processed signal 510 from VCR 114 to RF bypass switch 502. The interactive television program guide command signals on line 212 are also an input to RF bypass switch 502 and are used to control output 512 of RF bypass switch 502. Output 512 from RF bypass switch 502 may be either raw signal 506 or processed signal 510. The ability of RF bypass switch 502 to output either the raw or the processed signal is an attractive feature because it allows the user to view programs on channels that must be processed by a tuner for unscrambling or decoding, such as HBO, as well as those programs that do not.

When the interactive television program guide system is in watch-and-record mode, only raw signal 506 is transmitted on output 512 of RF bypass switch 502 and directed to television 116. Output 508 of tuner 504 in set-top box 500 is directed to VCR 114 only. Therefore, all of the programs (scrambled and unscrambled) that are available to the user from television distribution facility 110 may be recorded by VCR 114. When television 116 receives unprocessed raw signal 506, the user may view all of the programs available to that user from television distribution facility 110 that do not require processing or unscrambling by tuner 504. The user may tune the television by using remote control 118 to change the channels on the television and not by changing the channels on set-top box tuner 504. The interactive television program guide may process channel requests received from remote control 118 and may retransmit suitable channel changing commands to TV 116 using IR transmitter 200. In this mode, channel requests are redirected away from tuner 504, which is normally the recipient of such requests, to the tuner of television 116.

When television 116 is in a mode where it is receiving raw signal 506, use of the interactive television program guide is limited because many of the interactive television program guide's features require processing by set-top box tuner 504 and its output 508 to be directed to television 116. However, limited use of the interactive television program guide is still possible in this mode because some interactive television program guide features remain accessible to the user. For example, the interactive television program guide may display simple information such as the channel number on the front panel of the set-top box. The interactive television program guide may also prevent the user from attempting to tune to any channel that television 116 cannot decode due to scrambling. The interactive television program guide may provide the user with the option to select the last channel viewed, use favorite channel features or adjust television volume without interrupting the recording process. If the user had set a reminder for the time during which a recording is active, the interactive television program guide may automatically tune the television to the selected program. Alternatively, the interactive television program guide may allow the user to toggle between programs with reminders, by using a predefined key on remote control 118. If the user attempts to tune to a program that is parentally controlled, the interactive television program guide may prevent the transmission of channel-tuning commands to the television. In this case, the interactive television program guide may tune to the desired program only after a special personal identification number (PIN) is entered into remote control 118. The interactive television program guide may present a prompt for such a PIN on the front-panel display of set-top box 500. Interactive television program guide command signal 212 is an input to IR transmitter 200 and is used to send commands from the interactive television program guide to external devices such as television 116 and VCR 114 via infrared transmission signals. IR transmitter 200 may be optimally positioned so that VCR 114 and television 116 will receive the IR signal effectively.

The single tuner, RF bypass switch configuration of FIG. 5 operates in a similar manner to the two-tuner set-top box configurations described in FIGS. 2(*a*) and 2(*b*) in that it allows the user to watch one program while simultaneously recording another.

Figure 6:
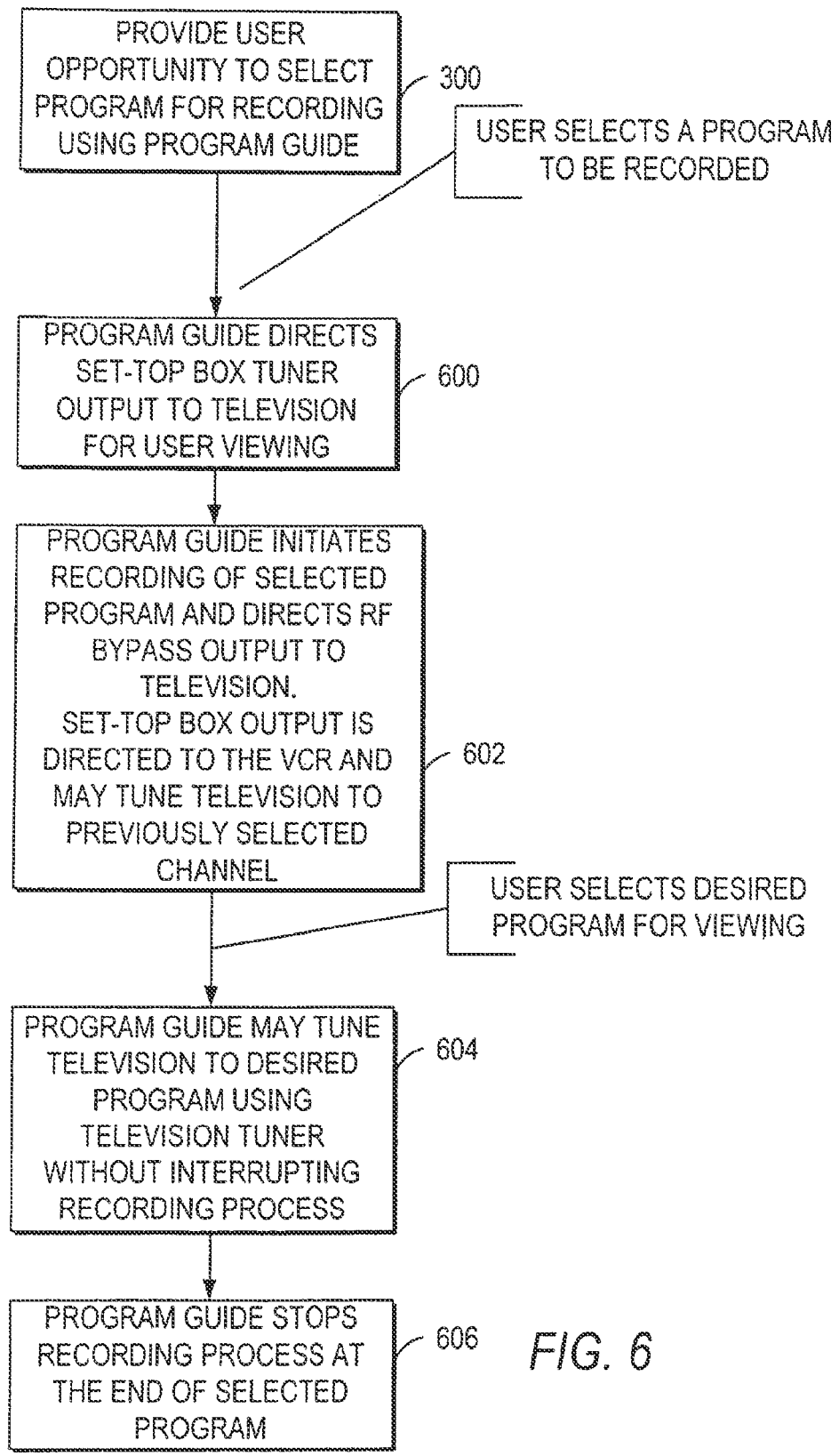
FIG. 6 is a flow chart of steps involved in using an interactive television program guide system that includes a set-top box that has one tuner and an external RF bypass switch of the type shown in FIG. 5 in accordance with the present invention.

FIG. 6 is a flow chart of steps involved in using an interactive television program guide system that includes a single tuner, RF bypass switch, and set-top box tuner output directed to VCR 114 as shown in FIG. 5. At step 300, the interactive television program guide provides the user with an opportunity to select a program to be recorded at some later time. After the user selects a program for recording, the interactive television program guide continues to direct set-top box tuner output 508 to television 116 at step 600 until the recording process has been initiated. Directing set-top box tuner output 508 of FIG. 5 to television 116 allows the user to view all programming available from television distribution facility 110.

At step 602, the interactive television program guide initiates the recording of the selected program by directing set-top box tuner output 508 to VCR 114. The interactive television program guide tunes set-top box tuner 504 to selected program and sets set-top box tuner output 508 to an optimal volume level for recording. Because set-top box tuner output 508 is being used to record the selected program, all programs available to the user from television distribution facility 110 may be recorded. When the recording process is initiated, the interactive television program guide directs raw signal 506 through RF bypass switch 502 and to television 116. Because television 116 receives raw signal 506 while the recording process is occurring only programs decodable by cable ready television 116 may be viewed. The interactive television program guide may send commands via IR transmitter 200 to tune television 116 to the channel previously watched by the user so as not to interrupt the program being viewed. While television 116 receives raw signal 506, the user has limited access to interactive television program guide features because to have full access to interactive television program guide features set-top box tuner 504 must not be in the record mode.

At step 604, without interrupting the recording process, a user may select a particular television channel by using remote control 118. When the user selects a channel, the interactive television program guide sends IR commands to the tuner of television 116 and not to set-top box tuner 504, thereby providing an interruption-free recording environment. In this configuration, the user may use a limited number of interactive television program guide functions such as parental control, reminders and volume control.

At step 606, when the selected program ends, the interactive television program guide sends IR commands to stop the recording process. The interactive television program guide directs the output of set-top tuner 504 to television 116 and also tunes set-top box tuner 504 to the channel television 116 was previously tuned to, which once again provides the user with the full range of programs available to the user and full access to interactive television program guide features. The interactive television program guide may change the volume of set-top box tuner output 508 back to the volume level selected by the user.

Figure 7:
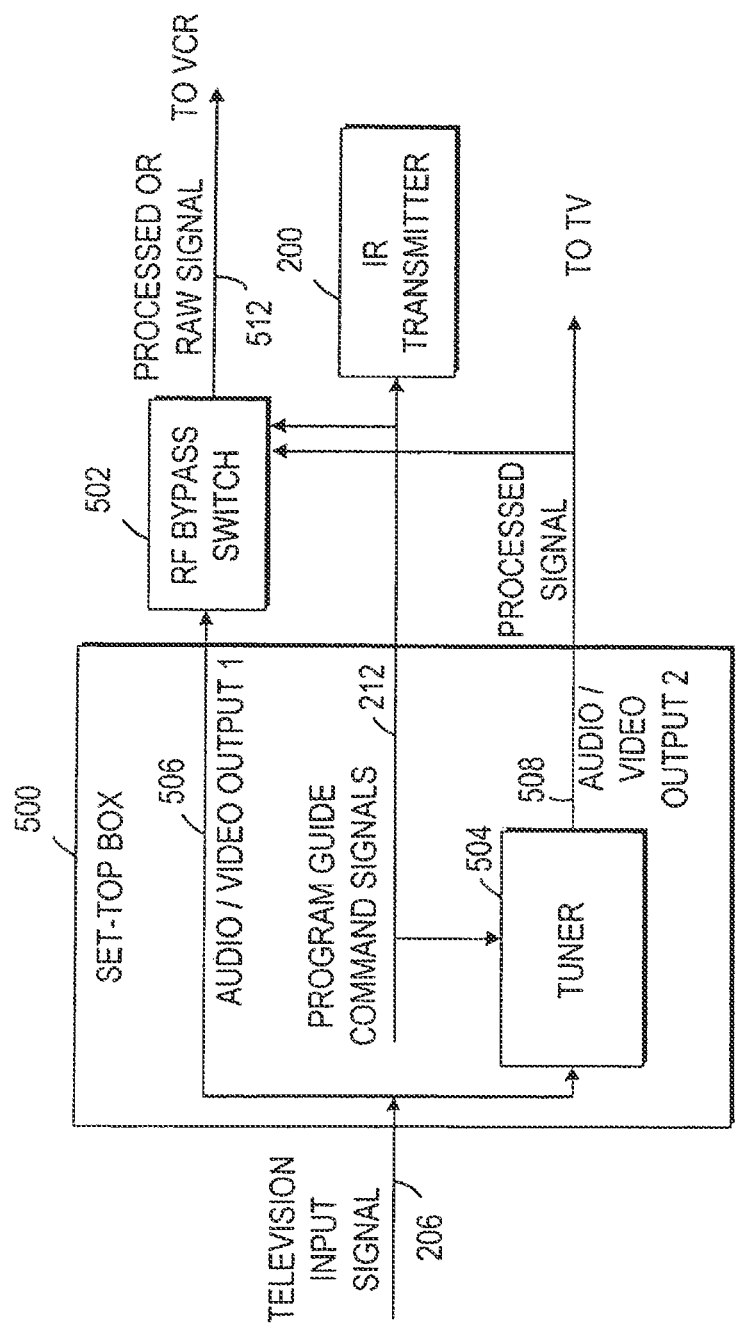
FIG. 7 is a diagram of an illustrative interactive television program guide system that includes a set-top box that has one tuner, an external RF bypass switch, and an external IR transmitter, and in which the set-top box tuner output is connected to the television in accordance with the present invention.

FIG. 7 is the second illustrative configuration of the single tuner and RF bypass switch set-top box system. Set-top box 500 is similar to that shown in FIG. 5. However, here, output 508 of tuner 504 is directed to television 116 and output 512 of RF bypass switch 502 is directed to VCR 114. RF bypass switch output 512 is controlled by interactive television program guide command signals on line 212, which are an input to RF bypass switch 502. In this configuration, if a user wanted to watch one program while recording another, VCR 114 is only able to record programs that can be decoded by the VCR (e.g., unscrambled and unprocessed analog channels). However, the user would also be able to view any program available to the user while simultaneously recording a selected program that is different from the program being viewed. If the user is not viewing television 116 any program available to the user may be recorded. The user may also view a scrambled program if that program is the same one being recorded. In addition, unlike in the first configuration of the single-tuner RF-bypass set-top box system shown in FIG. 5, the user would be able to use and enjoy the full range of available interactive television program guide features. The full range of interactive television program guide features may be used simultaneously with the recording function because set-top box tuner output 508 is input directly to television 116. In contrast to the set-top box embodiment shown in FIG. 5, where set-top box output 508 is directed to VCR 114 and full interactive television program guide use is not possible while in the watch and record mode, this single-tuner RF-bypass-switch embodiment does not interfere with the functionality of the interactive television program guide when VCR 114 recording function is in operation because set-top box tuner output 508 is directed to television 116 and not VCR 114.

Figure 8:
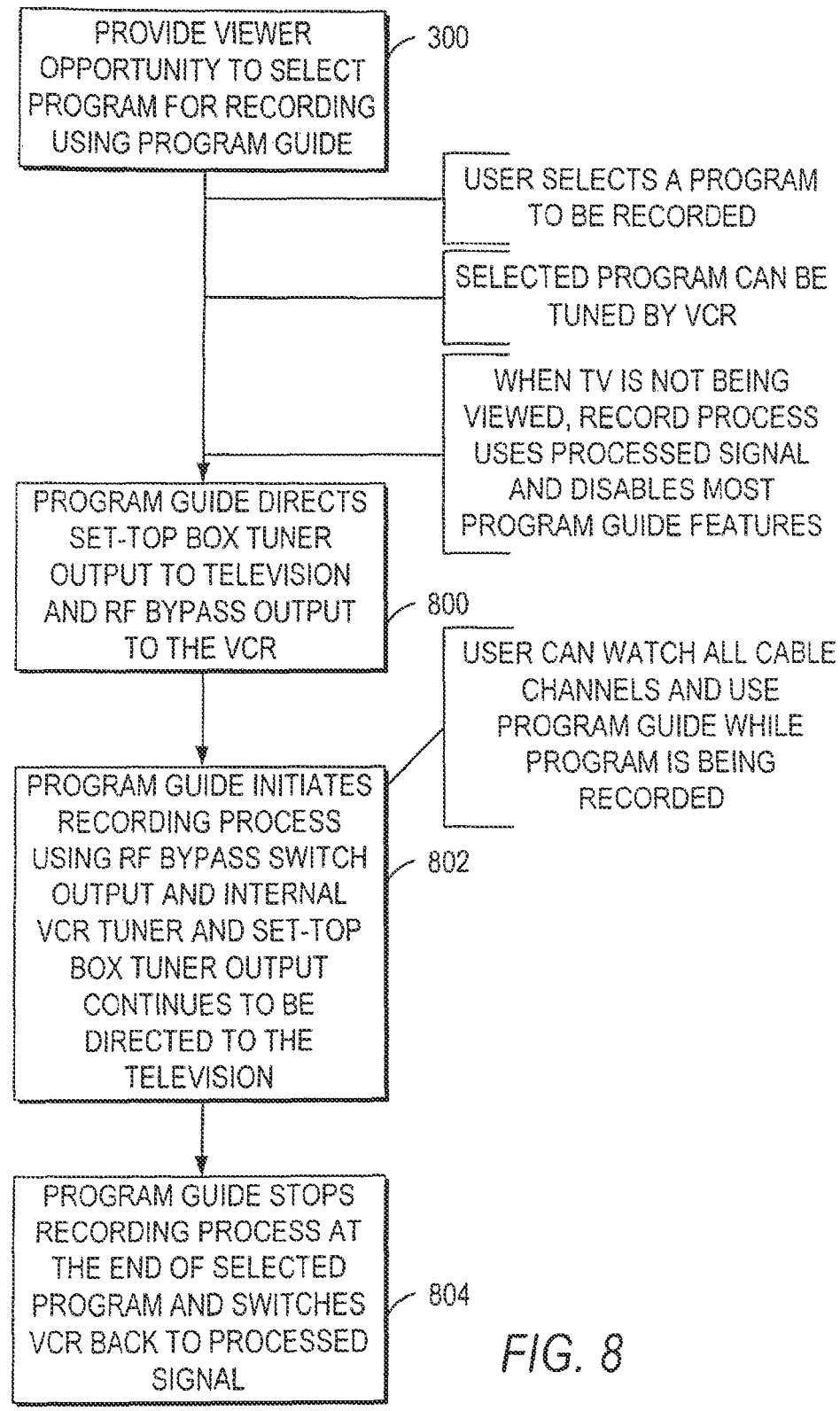
FIG. 8 is a flow chart of steps involved in using an interactive television program guide system that includes a set-top box that has one tuner and an external RF bypass switch and in which the set-top box tuner output is connected to the television as shown in FIG. 7 in accordance with the present invention.

FIG. 8 is a flow chart of steps involved in using an interactive television program guide system that includes a single-tuner RF-bypass switch, and set-top box tuner output 508 that is directed to a television as shown in FIG. 7. At step 300, the interactive television program guide provides the user with an opportunity to select a program to be recorded at some later time.

At step 800, after the user has selected a program to be recorded, the interactive television program guide continues to direct set-top box tuner output 508 to television 116 and switches raw signal 506 through RF bypass switch 502 to VCR 114.

At step 802, when the selected program is to begin, the interactive television program guide initiates recording of the selected program. The interactive television program guide sends IR commands that tune the internal tuner of VCR 114 to the desired channel for the selected program. This configuration of the present invention allows only programs that are decodable by VCR 114 to be recorded while another program is being viewed and not those programs that require processing or unscrambling by set-top box tuner 504. However, if television 116 is not being viewed, VCR 114 can record any program available to the user. While the recording process is occurring, set-top box tuner output 508 continues to be directed to television 116 providing the user with unlimited access to interactive television program guide features and all programs available to the user from television distribution facility 110.

At step 804, when the selected programs ends, the interactive television program guide sends IR commands to VCR 114 to stop the recording process. The interactive television program guide also switches raw signal 506 and processed signal 508 such that VCR 114 receives processed signal 508 once again.

Figure 9:
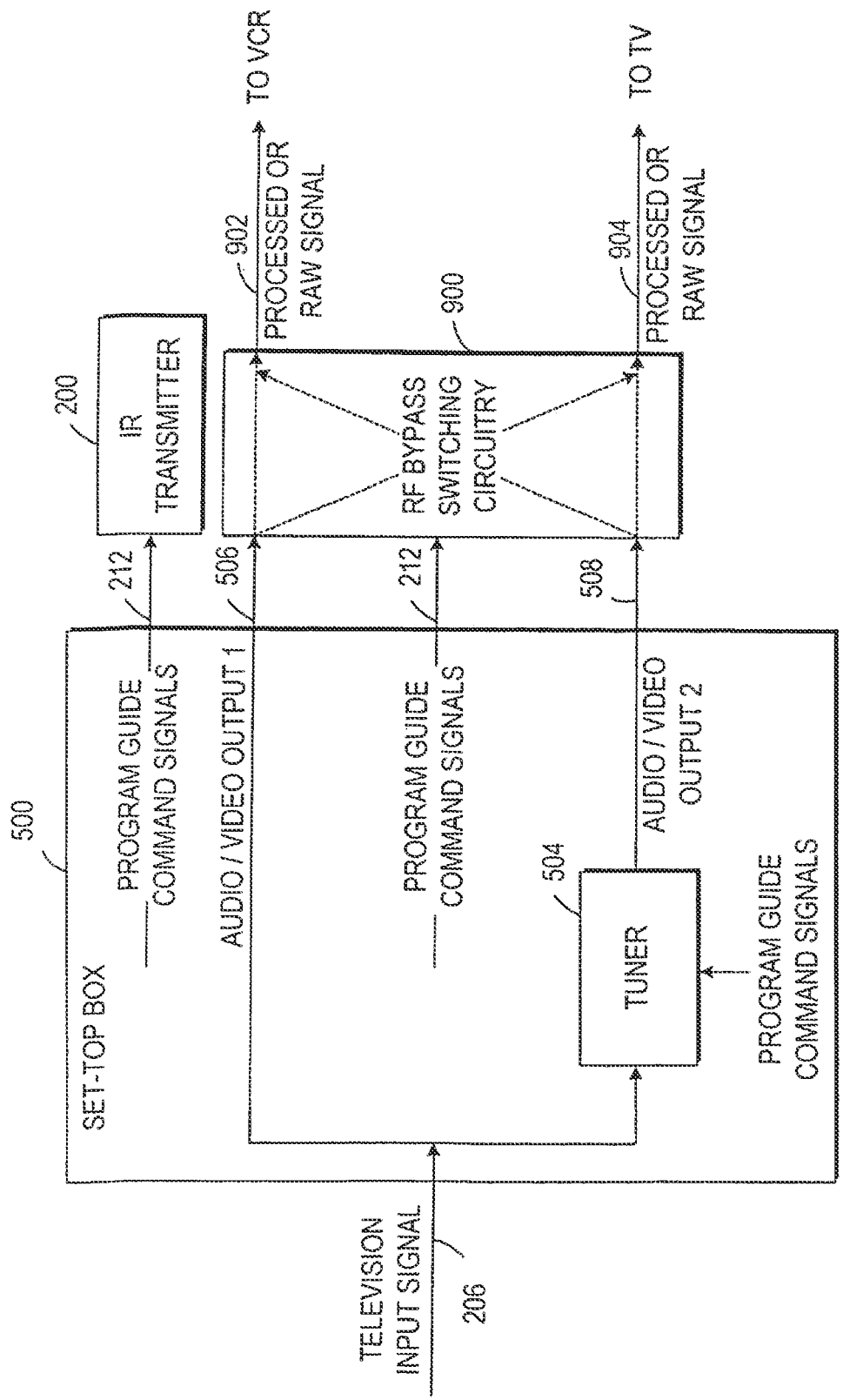
FIG. 9 is a diagram of an illustrative interactive television program guide system that includes a set-top box that has one tuner, an external RF bypass switching circuitry unit, and an external IR transmitter in accordance with the present invention.

FIG. 9 shows a diagram of a third illustrative configuration involving a single-tuner RF-bypass-switch system. In this configuration or pass through mode, RF bypass switch 900 has two outputs 902 and 904 and includes switching circuitry that provides the user with the ability to pass its two inputs 506 and 508 directly to outputs 902 and 904 respectively. In addition, outputs 902 and 904 of RF bypass switch 900 may be switched or placed in a switched mode to receive a signal from inputs 508 and 506 respectively, upon commands sent from the interactive television program guide via the interactive television program guide command signals on line 212. This switching capability allows the interactive television program guide to direct either raw signal 506 or processed signal 508 to either VCR 114 or television 116. In normal mode, raw signal 506 is directed to VCR 114 via output 902 and processed signal 508 is directed to television 116 via output 904. However, if VCR 114 is unable to record the selected program because the program's signal is scrambled or digital, the interactive television program guide will send commands via line 212 to RF bypass switch 900 to switch raw signal 506 to television 116 via output 904 and processed signal 508 to VCR 114 via output 902. This switch arrangement allows the user to record the selected program while simultaneously watching another program that does not require processing by tuner 504.

Figure 10:
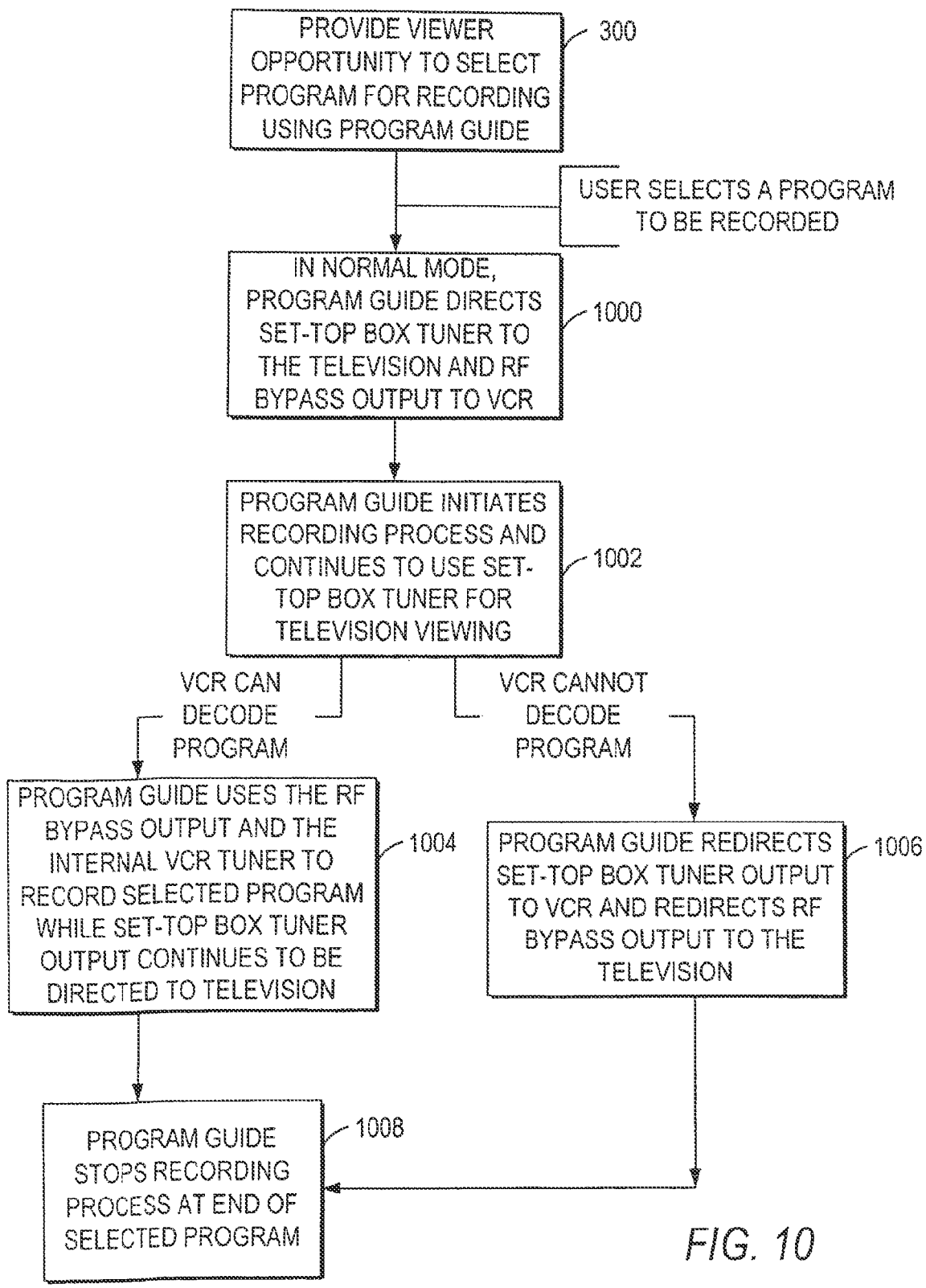
FIG. 10 is a flow chart of steps involved in using an interactive television program guide system that includes a set-top box of the type shown in FIG. 9 having one tuner, an external RF bypass switching circuitry unit, and an external IR transmitter in accordance with the present invention.

FIG. 10 is a flow chart of steps involved in using an interactive television program guide system that includes a single-tuner RF-bypass switch that can operate in two modes, pass through or switched, as shown in FIG. 9. At step 300, the interactive television program guide provides the user with an opportunity to select a program to be recorded at some later time.

At step 1000, the interactive television program guide directs set-top box tuner output 508 through RF bypass switch 900 via output 904 to television 116 and raw signal 506 through RF bypass switch 900 via 902 to VCR 114. A user may be watching television 116.

At step 1002, when the program is scheduled to begin, the interactive television program guide initiates recording of the program selected by the user. The record process may be initiated while a user is watching programming on television 116.

At step 1004, if VCR 114 can decode the channel on which the selected program will be broadcast, the program continues to direct set-top box tuner output 508 to television 116 and raw signal 506 through RF bypass switch 900 to VCR 114. The interactive television program guide sends IR commands to the internal tuner of VCR 114 that tune to the desired channel for the selected program and directs VCR 114 to start recording the selected program. This allows the user to view any program available to the user from television distribution facility 110 without any interruptions due to the recording process.

At step 1006, if VCR 114 cannot decode the channel on which the selected program will be broadcast, the interactive television program guide redirects set-top box output 508 from television 116 to VCR 114 and also redirects raw signal 506 through RF bypass switch 900 from VCR 114 to television 116. The interactive television program guide may set set-top box tuner output 508 to an optimal volume level for recording. The interactive television program guide sends commands on line 212 to tune set-top box tuner 504 to tune to the channel on which the selected program will be broadcast. The interactive television program guide also sends IR commands to television 116 to tune it to the channel, if unscrambled, that the user was viewing prior to the switch. This provides the user with the ability to record any program available to him from television distribution facility 110. However, the user may only view programs decodable by cable-ready television 116. Similar to the configuration described in FIG. 5 in this configuration when television 116 is in a mode where it is receiving raw signal 506, use of the interactive television program guide is limited because many of the interactive television program guide's features require processing by set-top box tuner 504 and its output 508 to be directed to television 116. However, limited use of the interactive television program guide is still possible in this mode because some interactive television program guide features remain accessible to the user. See description for FIG. 5.

At step 1008, when the selected programs ends, the interactive television program guide sends IR commands to VCR 114 to stop the recording process. The interactive television program guide switches raw signal 506 and processed signal 508 so that raw signal 506 is directed to VCR 114 and processed signal 508 is directed to television 116 once again. The interactive television program guide may tune set-top box tuner 504 to the channel that was being viewed prior to the switch to provide the viewer with an interruption-free viewing environment.

Figure 11A:
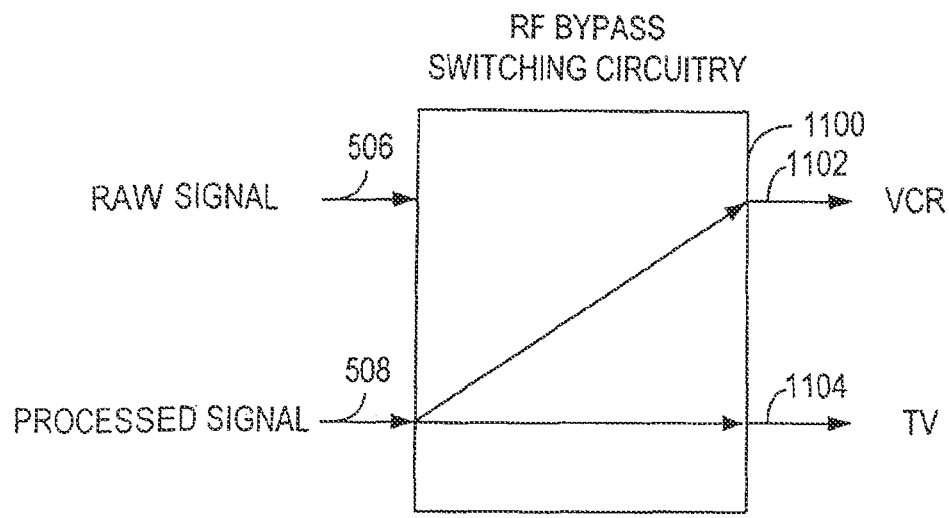
FIG. 11(a) is a diagram illustrating a switching position to which an external RF bypass switching circuitry unit can be set so that both outputs of the RF bypass switching circuitry unit transmit a processed signal in accordance with the present invention.

FIG. 11(a) shows RF bypass switch 1100 in one of three possible positions. RF bypass switch 1100 may be used in place of RF bypass switch 900 of FIG. 9 in a single-tuner RF-bypass-switch interactive television program guide system. When this substitution is made, a very versatile configuration of the single-tuner RF-bypass-switch interactive television program guide system results. FIG. 11(a) shows RF bypass switch 1100 in its normal position. The normal position allows processed signal 508 from set-top box tuner 504 to be output from both RF bypass switch outputs 1102 and 1104 to be directed to VCR 114 and television 116, respectively.

Figure 11B:
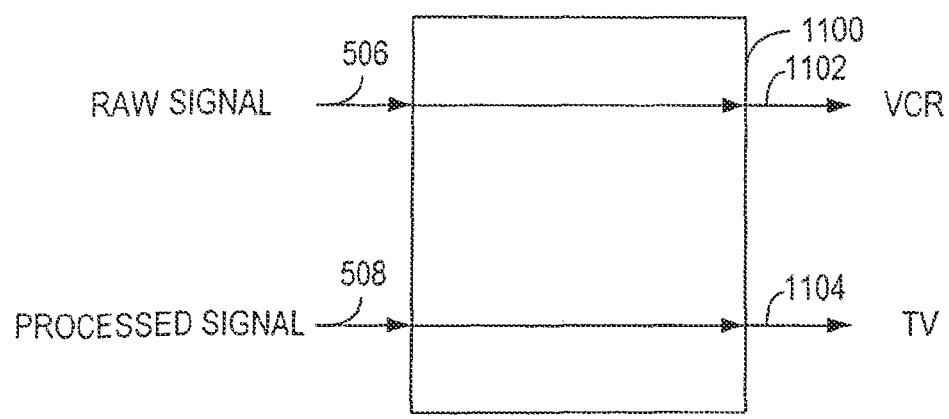
FIG. 11(b) is a diagram illustrating a switching position to which an external RF bypass switching circuitry unit can be set so that an unprocessed television signal is directed to the VCR and a processed television signal is directed to the television in accordance with the present invention.

FIG. 11(b) shows another switch position of RF bypass switch 1100. This position allows inputs 506 and 508 to be passed directly through RF bypass switch 1100 to outputs 1102 and 1104, respectively.

Figure 11C:
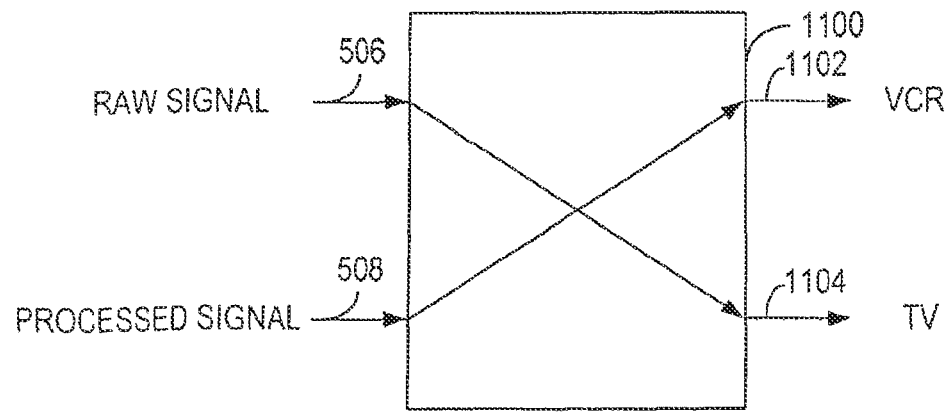
FIG. 11(c) is a diagram illustrating a switching position to which an external RF bypass switching circuit can be set so that the unprocessed television signal is directed to the television input and the processed television signal is directed to the VCR input in accordance with the present invention.

FIG. 11(c) shows another switch position of RF bypass switch 1100. This position allows inputs 506 and 508 to be switched to outputs 1104 and 1102, respectively.

Figure 12:
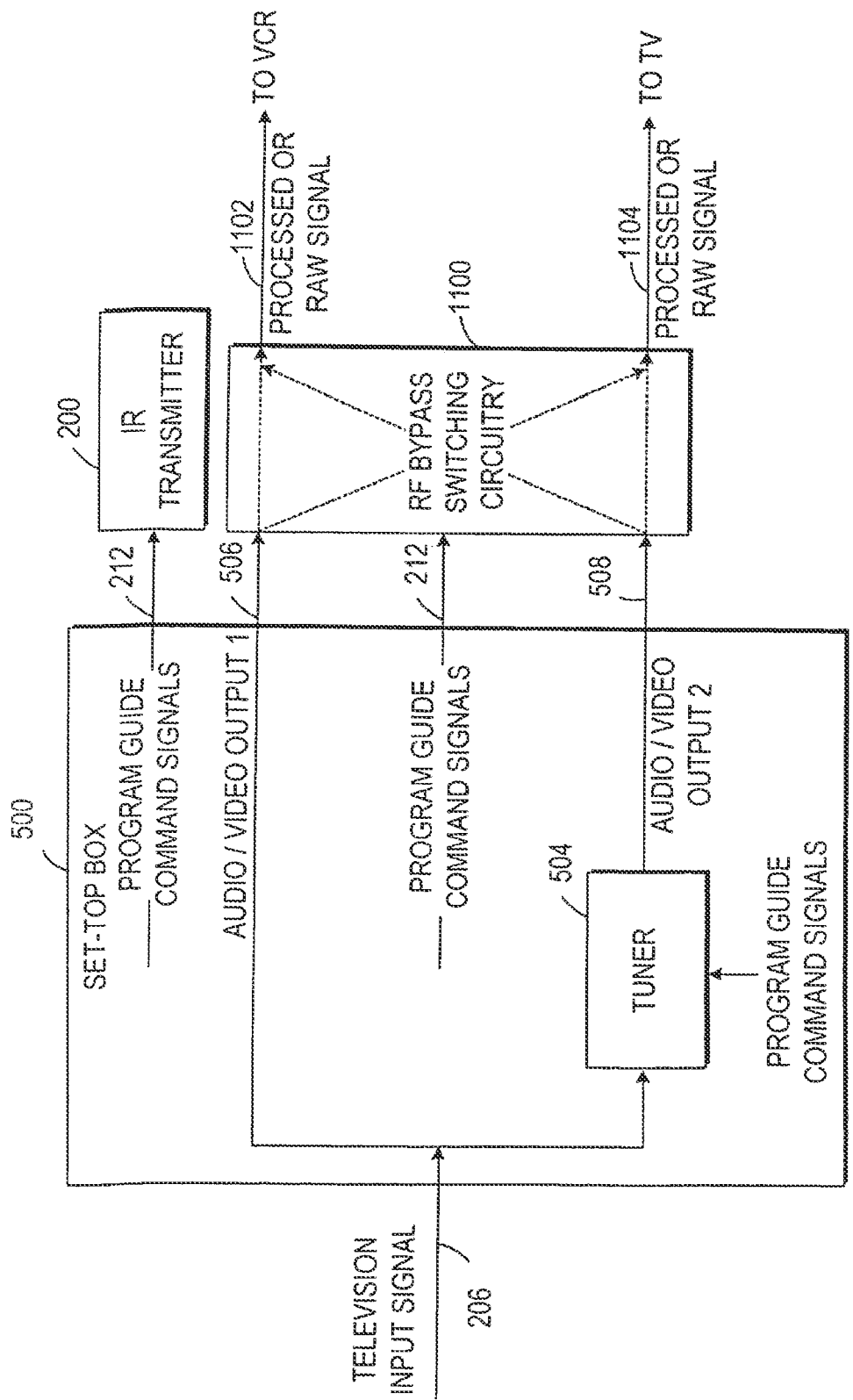
FIG. 12 is a diagram of an illustrative interactive television program guide system that includes a set-top box that has one tuner, an external RF bypass switching circuitry unit described in FIGS. 11(a), 11(b), and 11(c), and an external IR transmitter in accordance with the present invention.

FIG. 12 shows a diagram of a fourth illustrative configuration of the single-tuner RF-bypass-switch set-top box interactive television program guide system. The FIG. 12 configuration uses RF bypass switching circuitry 1100 (shown in FIG. 11), which is more complicated than RF-bypass switching circuitry 900 (shown in FIG. 9). In this embodiment, the RF bypass switch provides the user with three distinct combinations for the two outputs. These three distinct combinations are as follows: 1) both the outputs 1102 and 1104 transmit processed signal 508 to VCR 114 and television 116 respectively; 2) output 1102 transmits raw signal 506 to VCR 114 and output 1104 transmits the processed signal 508 to television 116; and 3) output 1102 transmits processed signal 508 to VCR 114 and the output 1104 transmits raw signal 506 to television 116. In the normal mode, both VCR 114 and television 116 receive processed signal 508 from the set-top box tuner 504. The normal mode may be used to simultaneously watch and record, but the program watched by the viewer must be the same as that being recorded. If different programs are watched and recorded and the program selected to be recorded is unscrambled or can be decoded by VCR 114, the interactive television program guide switches output 1102 of RF-bypass switch 1100 to a position such that VCR 114 can receive raw signal 508. In this situation, television 116 continues to receive the processed signal from set-top box tuner 504, which gives the user unrestricted access to all programs available to the user, in addition to the unrestricted use of the interactive television program guide and its many features. The user is able to watch one program while recording another. If the selected program cannot be unscrambled by VCR 114, the interactive television program guide will send commands to RF bypass switch 1100 that command processed signal 508 to be directed to VCR 114 and raw signal 506 to be directed to the television. In this switching position, the user is restricted to viewing programs that do not require unscrambling or processing by set-top box tuner 504.

Figure 13:
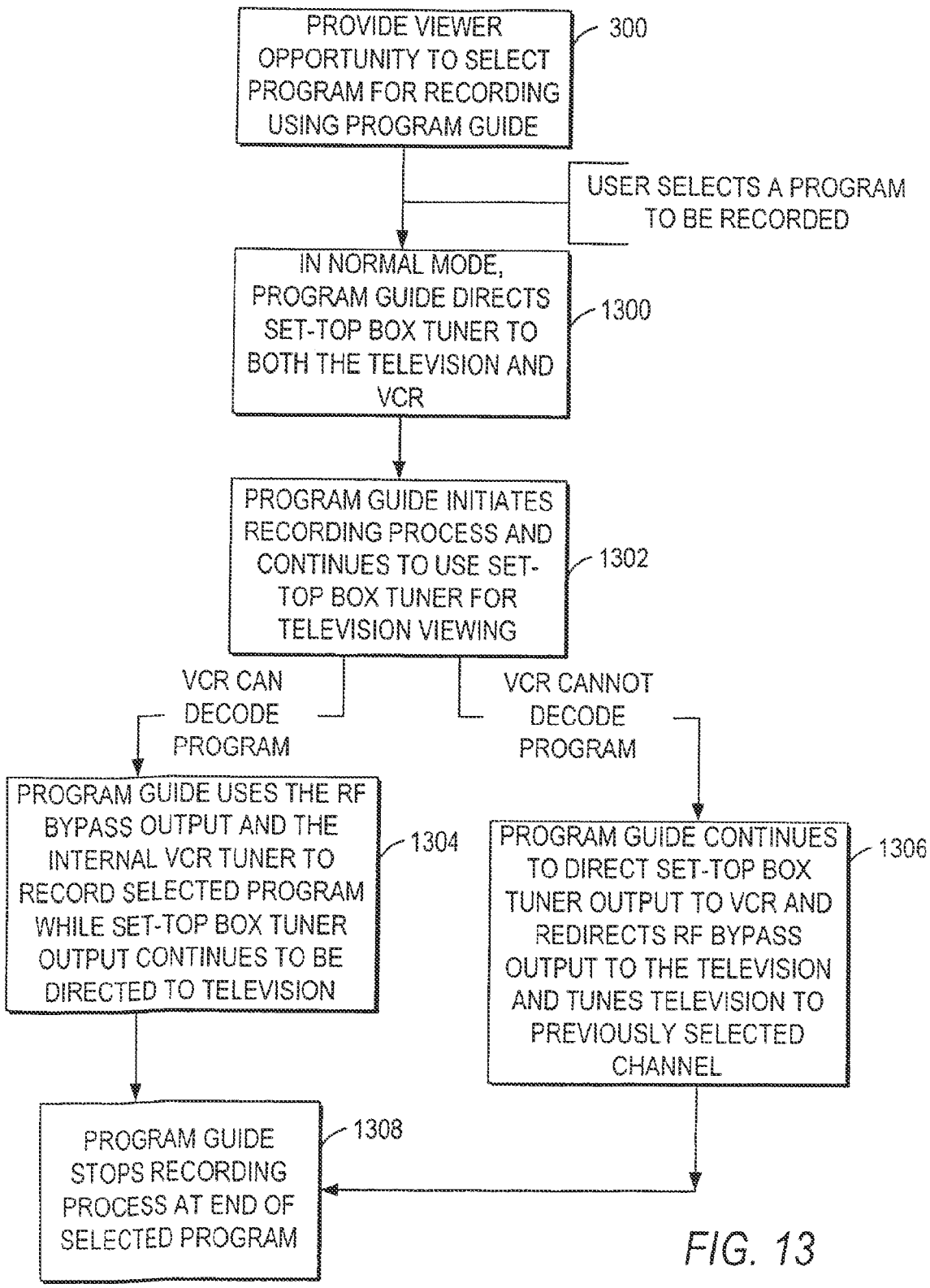
FIG. 13 is a flow chart of steps involved in using an interactive television program guide system that includes a set-top box that has one tuner and an external RF bypass switching circuitry unit as shown in FIG. 11 having three distinct switching positions in accordance with the present invention.

FIG. 13 is a flow chart of steps involved in using the interactive television program guide system shown of FIG. 12, which includes single tuner 504 and the substituted RF bypass switch 1100 shown in FIG. 11 that can operate in three modes.

At step 300, the interactive television program guide provides the user with an opportunity to select a program to be recorded at some later time.

At step 1300, the interactive television program guide directs set-top box tuner output 508 to television 116 and to VCR 114. This arrangement is the normal switching position for this configuration of the present invention.

At step 1302, the interactive television program guide initiates recording of the program selected by the user.

At step 1304, while the user is viewing television 116, if VCR 114 can decode the channel on which the selected program will be broadcast, the interactive television program guide continues to direct set-top box tuner output 508 to television 116 and raw signal 506 through RF bypass switch 1100 to VCR 114. The interactive television program guide sends IR commands that tune the internal tuner of VCR 114 to the desired channel for the selected program and that directs VCR 114 to start recording the selected program. This allows the user to view any program available to the user from his cable company without any interruptions due to the recording process.

At step 1306, while the user is viewing television 116, if VCR 114 cannot decode the channel on which the selected program will be broadcast, the interactive television program guide redirects set-top box output 508 from television 116 to VCR 114 and also redirects raw signal 506 through RF bypass switch 1100 from VCR 114 to television 116. The interactive television program guide may set set-top box tuner output 508 to an optimal volume level for recording. The interactive television program guide may tune television 116 to channel previously selected by the user. This provides the user with the ability to record any program available from television distribution facility 110. However, the user may only view programs decodable by cable television 116. As mentioned previously in the specifications for FIGS. 5 and 10, when television 116 is in a mode where it is receiving raw signal 506, use of the interactive television program guide is limited because many of the interactive television program guide's features require processing by set-top box tuner 504 and its output 508 to be directed to television 116. However, limited use of the interactive television program guide is still possible in this mode because some interactive television program guide features remain accessible to the user.

At step 1308, when the selected programs ends, the interactive television program guide sends IR commands to the VCR to stop the recording process. The interactive television program guide switches raw signal 506 and processed signal 508 so that processed signal 508 is directed to both VCR 114 and television 116. The interactive television program guide may tune set-top box tuner 504 to channel selected prior to the switch.

The interactive television program guide system provides the user with a variety of watch and record options that depend on the particular signal switching options, tuner capabilities, and tuner functions available in user television equipment 106. The interactive television program guide system may use various types of switches to implement the necessary signal routing between user program guide equipment tuners, the viewing device tuner and the recording device tuner. A switch may have one or more outputs depending on the interactive television program guide system's configuration. Thus, signal switching options relate to the switching capabilities associated with a particular type of switch. Tuner capabilities relate to whether a tuner is capable to decoding a scrambled television input signal, or a digital signal. For example, when a user requests to view a scrambled program the interactive television program guide allocates a tuner that is capable: of decoding the scrambled signal such as a set-top box tuner, and does not allocate a tuner such as a viewing device tuner that may be incapable of decoding the signal. The allocated tuner provides a corresponding unscrambled or processed signal to viewing device 116 so that the user is able to view the requested program.

A tuner that is "less capable" of fulfilling a user request is a tuner that is capable of handling the user request. For example, a viewing device tuner may be capable of handling a user request to view an unscrambled program. In that case the interactive television program guide will not allocate a tuner that is capable of unscrambling signals such as a set-top box tuner, because it is not necessary to do so.

Tuner functions relate to the various user-requested and non-user-requested automatic functions that a tuner can perform. Tuner functions, also referred to as secondary functions include providing the user with the ability to view and to record selected television programs using the interactive television program guide, collect data from the television input signal while another tuner is performing another function, supporting Internet browsing, providing the user with the capability to play a particular music channel or to obtain music information, providing the user with interactive services, performing a background process or providing a second video image (PIP).

Another option provided to the user by the interactive television program guide is the watch option. The watch option allows the user to immediately view a selected program if the program is currently being broadcast when the user selects it from a group of interactive television program guide program listings or if the program will be broadcast in the future, the watch option allows the user to set a reminder that will remind the user that the selected program is about to begin. The user may set a reminder that will displayed while the viewer is watching a television program or the user may set the reminder to automatically tune to the selected program when it is time for that program to begin.

While a user is viewing or attempting to view a particular program the interactive television program guide will allocate tuner resources that are composed of one or more tuners for the viewing activity. The interactive television program guide may allocate tuner resources based on an assumption that the user is always viewing a particular program or that the user desires to view a particular program.

In the case where a user is initially watching and recording the same program, then while the recording is still continuing the user desires to watch a different program, the interactive television program guide may allocate another tuner to accommodate the user's request in accordance with the configurations of the present invention described above.

The optimal volume feature is a feature that allows the interactive television program guide to automatically set the output of a tuner that has been allocated for recording to its optimal volume level some time prior to the start of the recording process.

The parental control feature is a capability of the interactive television program guide to prevent access to programs or channels that the user desires to block access to unless a special access code or personal identification number ("PIN") is entered into the interactive television program guide system. After the PIN is entered into the system by the user, the user program guide equipment provides user feedback on a numeric display. The user feedback may be in the form of a user prompt, an indication that the correct or incorrect PIN has been entered, dashed lines or some other suitable method of providing the user with feedback.

Interactive television program guide features include tuner functions such as watch and record, PIP, etc., or non-tuner based features such as providing the user with program listings, program information displays and on-screen menu displays, etc.

The foregoing is merely illustrative of the principles of this invention and various modifications can be made by those skilled in the art without departing from the scope and spirit of the invention.

What is claimed is:

1. A method for resolving a conflict when multiple operations are performed using multiple tuners controlled by an interactive television program guide, the method comprising:
   receiving a request to perform a tuning operation;
   determining that neither a first tuner nor a second tuner are available to perform the requested tuning operation, wherein the first tuner and the second tuner are both capable of performing the tuning operation; and
   in response to the determination, displaying an alert that provides a user with an opportunity to direct the interactive television program guide to cancel a function of the second tuner to permit the second tuner to perform the requested tuning operation.

2. The method of claim 1 further comprising:
   receiving a user selection to not cancel the function of the second tuner; and
   in response to the user selection to not cancel the function of the second tuner, continuing to perform the function of the second tuner.

3. The method of claim 1 further comprising:
   receiving a user selection to cancel the function of the second tuner; and
   in response to the user selection to cancel the function of the second tuner, canceling the function of the second tuner and performing the requested tuning operation.

4. The method of claim 1 wherein the requested tuning operation, the function of the second tuner, and a function of the first tuner each comprises a tuning function selected from the group consisting of viewing television programming, recording television programming, and performing a secondary tuner function.

5. The method of claim 4 wherein the secondary tuner function comprises a tuning function selected from the group consisting of providing a picture-in-picture signal, collecting program guide data, browsing the Internet, and playing a music channel.

6. The method of claim 1 wherein a function of the first tuner is viewing a first television program, the function of the second tuner is performing a secondary tuner function, and the requested tuning operation is recording a second television program.

7. The method of claim 1 wherein a function of the first tuner is viewing a first television program, the function of the second tuner is recording a second television program, and the requested tuning operation is performing a secondary tuner function.

8. The method of claim 1 wherein a function of the first tuner is viewing a first television program, the function of the second tuner is recording a second television program, and the requested tuning operation is viewing a third television program.

9. The method of claim 1 wherein the alert provides the user with the opportunity to direct the interactive television program guide to cancel the function of the second tuner when the function of the second tuner is viewing a television program, and provides the user with the opportunity to direct the interactive television program guide to cancel a function of the first tuner when the function of the first tuner is viewing the television program.

10. The method of claim 1 wherein the displaying the alert comprises displaying a display screen using the interactive television program guide that provides the user with a first option to continue to perform the function of the second tuner, and with a second option to cancel the function of the second tuner to perform the requested tuning operation.

11. The method of claim 1 wherein the user selects to cancel the function of the second tuner to permit the second tuner to perform the requested tuning operation using a remote control.

12. The method of claim 1 wherein the first tuner and the second tuner are included in a single device.

13. A system for resolving a conflict when multiple operations are performed using multiple tuners controlled by an interactive television program guide, the system comprising:
    a first tuner;
    a second tuner; and
    an interactive television program guide implemented on the system, wherein the interactive television program guide is operative to:
        receive a request to perform a tuning operation;
        determine that neither the first tuner nor the second tuner are available to perform the requested tuning operation, wherein the first tuner and the second tuner are both capable of performing the tuning operation; and
        in response to the determination, display an alert that provides a user with an opportunity to direct the interactive television program guide to cancel a function of the second tuner to permit the second tuner to perform the requested tuning operation.

14. The system of claim 13 wherein the interactive television program guide is further operative to:
    receive a user selection to not cancel the function of the second tuner; and
    in response to the user selection to not cancel the function of the second tuner, continue to perform the function of the second tuner.

15. The system of claim 13 wherein the interactive television program guide is further operative to:
    receive a user selection to cancel the function of the second tuner; and
    in response to the user selection to cancel the function of the second tuner, cancel the function of the second tuner and perform the requested tuning operation.

16. The system of claim 13 wherein the requested tuning operation, the function of the second tuner, and a function of the first tuner each comprises a tuning function selected from the group consisting of viewing television programming, recording television programming, and performing a secondary tuner function.

17. The system of claim 16 wherein the secondary tuner function comprises a tuning function selected from the group consisting of providing a picture-in-picture signal, collecting program guide data, browsing the Internet, and playing a music channel.

18. The system of claim 13 wherein a function of the first tuner is viewing a first television program, the function of the second tuner is performing a secondary tuner function, and the requested tuning operation is recording a second television program.

19. The system of claim 13 wherein a function of the first tuner is viewing a first television program, the function of the second tuner is recording a second television program, and the requested tuning operation is performing a secondary tuner function.

20. The system of claim 13 wherein a function of the first tuner is viewing a first television program, the function of the second tuner is recording a second television program, and the requested tuning operation is viewing a third television program.

21. The system of claim 13 wherein the alert provides the user with the opportunity to direct the interactive television program guide to cancel the function of the second tuner when the function of the second tuner is viewing a television program, and provides the user with the opportunity to direct the interactive television program guide to cancel a function of the first tuner when the function of the first tuner is viewing the television program.

22. The system of claim 13 wherein the displaying the alert comprises displaying a display screen using the interactive television program guide that provides the user with a first option to continue to perform the function of the second tuner, and with a second option to cancel the function of the second tuner to perform the requested tuning operation.

23. The system of claim 13 wherein the user selects to cancel the function of the second tuner to permit the second tuner to perform the requested tuning operation using a remote control.

24. The system of claim 13 wherein the first tuner and the second tuner are included in a single device.

* * * * *

UNITED STATES PATENT AND TRADEMARK OFFICE
CERTIFICATE OF CORRECTION

PATENT NO.        : 8,621,512 B2                                Page 1 of 1
APPLICATION NO.   : 13/280215
DATED             : December 31, 2013
INVENTOR(S)       : Michael D. Ellis et al.

It is certified that error appears in the above-identified patent and that said Letters Patent is hereby corrected as shown below:

In the Claims

At column 19, claim number 13, line number 51, please change "are available to perform" to --is available to perform--.

Signed and Sealed this
First Day of September, 2015

Michelle K. Lee
*Director of the United States Patent and Trademark Office*